tion No. 60/583,903, filed on Jun.
(12) United States Patent
Adya et al.

(10) Patent No.: US 7,472,129 B2
(45) Date of Patent: Dec. 30, 2008

(54) LOSSLESS RECOVERY FOR COMPUTER SYSTEMS WITH MAP ASSISTED STATE TRANSFER

(75) Inventors: Atul Adya, Redmond, WA (US); Jacob R. Lorch, Bellevue, WA (US); Ronnie I Chaiken, Woodinville, WA (US); William J. Bolosky, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 281 days.

(21) Appl. No.: 10/978,280

(22) Filed: Oct. 29, 2004

(65) Prior Publication Data

US 2005/0289169 A1 Dec. 29, 2005

Related U.S. Application Data

(60) Provisional application No. 60/583,903, filed on Jun. 29, 2004.

(51) Int. Cl.
*G06F 17/30* (2006.01)

(52) U.S. Cl. .............. 707/101; 707/10; 707/103 Y; 707/202; 707/204

(58) Field of Classification Search .......... 707/101, 707/103
See application file for complete search history.

(56) References Cited

U.S. PATENT DOCUMENTS

| 4,639,864 | A | * | 1/1987 | Katzman et al. ............. 714/14 |
| 4,959,774 | A | * | 9/1990 | Davis ............................ 714/6 |
| 5,032,979 | A | | 7/1991 | Hecht et al. |
| 5,138,710 | A | | 8/1992 | Kruesi et al. |
| 5,519,831 | A | * | 5/1996 | Holzhammer ............... 714/22 |
| 5,546,536 | A | * | 8/1996 | Davis et al. ................. 714/20 |
| 5,630,050 | A | * | 5/1997 | Neuhard et al. ............. 714/27 |
| 5,734,818 | A | * | 3/1998 | Kern et al. ................... 714/20 |
| 5,959,969 | A | | 9/1999 | Croslin et al. |
| 5,996,001 | A | * | 11/1999 | Quarles et al. ............ 709/203 |
| 6,035,379 | A | * | 3/2000 | Raju et al. ................. 711/162 |
| 6,067,550 | A | * | 5/2000 | Lomet ....................... 707/202 |
| 6,078,999 | A | * | 6/2000 | Raju et al. ................. 711/161 |
| 6,978,279 | B1 | * | 12/2005 | Lomet et al. ............... 707/202 |
| 6,996,733 | B2 | * | 2/2006 | Hershenson et al. ....... 713/340 |
| 7,065,540 | B2 | * | 6/2006 | Chandrasekaran et al. .. 707/203 |
| 7,093,086 | B1 | * | 8/2006 | van Rietschote ........... 711/161 |
| 7,096,382 | B2 | * | 8/2006 | Novick ...................... 714/20 |
| 7,162,662 | B1 | * | 1/2007 | Svarcas et al. ............. 714/15 |

(Continued)

OTHER PUBLICATIONS

Muthitacharoen, et al, "Ivy: A read/write peer-to-peer file system," 5th *Symposium on Operating Systems Design and Implementation* (OSDI), pp. 31-44 (Dec. 2002).

(Continued)

*Primary Examiner*—Christian P. Chace
*Assistant Examiner*—Bai D Vu
(74) *Attorney, Agent, or Firm*—Lee & Hayes, PLLC

(57) ABSTRACT

Described are systems and techniques for losslessly restarting subsystems in a distributed file system. By partitioning functionality and logging appropriately across the kernel and user-level boundaries on a client, the user-level subsystem may be made losslessly restartable. In particular, a map assisted state transfer may include receiving one or more state updates, marshaling one or more active data-structures into a marshaled shadow, applying the received state updates to the marshaled shadow and re-instantiating the active data-structures by unmarshaling the marshaled shadow.

31 Claims, 12 Drawing Sheets

U.S. PATENT DOCUMENTS

| | | | |
|---|---|---|---|
| 2002/0035706 A1* | 3/2002 | Connor et al. | 714/15 |
| 2003/0115513 A1* | 6/2003 | Harriman et al. | 714/49 |
| 2003/0126195 A1* | 7/2003 | Reynolds et al. | 709/203 |
| 2004/0031030 A1* | 2/2004 | Kidder et al. | 717/172 |

OTHER PUBLICATIONS

Oki et al., "Viewstamped replication: a new primary copy method to support highly-available distributed systems," *Proceedings of the 7th Annual ACM Symposium on Principles of Distributed Computing* (PODC), pp. 8-17 (Aug. 1988).

Rodrigues, et al., "BASE: Using Abstraction to Improve Fault Tolerance," *Proceedings of the 14th ACM Symposium on Operating Systems Principles* (SOSP), pp. 15-28 (Oct. 2001).

Rosenblum et al., "The Design and Implementation of a Log-Structured File System," *Proceedings of the 14th ACM Symposium on Operating Systems Principles* (SOSP), pp. 26-52 (Oct. 1991).

Saito, et al., "Taming aggressive replication in the pangaea wide-area file system," *5th Symposium on Operating Systems Design and Implementation* (OSDI), pp. 15-30 (Dec. 2002).

Satyanarayanan, et al., "The ITC distributed file system: principles and design," *Proceedings of the 10th ACM Symposium on Operating Systems Principles* (SOSP), pp. 35-50 (Dec. 1991).

Satyanarayanan, et al., "Lightweight Recoverable Virtual Memory," *Proceedings of the 14th ACM Symposium on Operating Systems Principles* (SOSP), pp. 146-160 (Dec. 1993).

Swart, et al., *Availability in the Echo file system*, Technical Report 112, Digital Systems Research Center, pp. 1-43 (Sep. 1993).

Thekkath, et al., "Frangipani: A scalable distributed file system," *Proceedings of the 16th ACM Symposium on Operating Systems Principles* (SOSP), pp. 224-237 (Oct. 1997).

Tweedie, Stephen, "EXT3, Journaling File System," pp. 1-32 (Jul. 2000) printed at http://olstrans.sourceforge.net/release/OLS2000-ext3/OLS2000-ext3.html on Sep. 16, 2004.

Adya et al., "Cooperative Task Management without Manual Stack Management," *Proceedings of the 2002 Usenix Annual Technical Conference*, Monterey, CA (Jun. 2002).

Baker, Mary Louise Gray, "Fast Crash Recovery in Distributed File Systems," *PhD Dissertation*, Computer Science, University of California, Berkeley, CA (1994).

Candea, George & Armando Fox, "Crash-Only Software," *Proceedings of the 9th Workshop on Hot Topics in Operating Systems* (May 2003).

Chou, Timothy C. K., "Beyond Fault Tolerance," *IEEE Computer*, vol. 30, No. 4 (Apr. 1997).

Ghemawat et al, "The Google File System," *19th ACM Symposium on Operating Systems Principles*, Lake George, NY, (Oct. 2003).

Ousterhout, J., "Why Threads are a Bad Idea (for most purposes)," *Proceedings of the 1996 Usenix Annual Technical Conference* (Jan. 1996).

Patterson et al., "Recovery Oriented Computing (ROC): Motivation, Definition, Techniques and Case Studies," *Computer Science Technical Report*, UCB//CSD-02-1175, U.C. Berkeley (Mar. 2002).

Satyanarayanan, et al., "On the Ubiquity of Logging in Distributed File Systems," *Proceedings of the Third Workshop on Workstation Operating Systems* (Apr. 1992).

Adya et al., "FARSITE: Federated, available, and reliable storage for an incompletely trusted environment," *5th Symposium on Operating Systems Design and Implementation* (OSDI), pp. 1-14 (Dec. 2002).

Bar, Moshe, "Journaling Filesystems," *Linux Magazine*, pp. 1-14 (Aug. 2000) printed at http://www.linux-mag.com/cgi-bin/printer.pl?issue=2000-08&article=journaling on Sep. 16, 2004.

Candea, et al., Automatic failure-path inference: A generic introspection technique for internet applications, *IEEE Workshop on Internet Applications* (WIAPP), pp. 132-142 (Jun. 2003).

Castro et al., "Practical Byzantine Fault Tolerance," *3rd Symposium on Operating Systems Design and Implementation* (OSDI), pp. 173-186 (Feb. 1999).

Devarakonda, et al., "Recovery in the calypso file system," *ACM Transactions on Computer Systems* (TOCS), vol. 14, No. 3, pp. 287-310 (Aug. 1996).

Ganger et al, "Metadata update performance in file systems," *Symposium on Operating Systems Design and Implementation* (OSDI), pp. 1-12 (Nov. 1994).

Hartman et al., "The Zebra Striped Network File System," *Proceedings of the 14th ACM Symposium on Operating Systems Principles* (SOSP), pp. 29-43 (Dec. 1993).

Howard et al., "Scale and performance in a distributed file system," *ACM Transactions on Computer Systems* (TOCS), vol. 6, No. 1, pp. 51-81 (Feb. 1988).

Johnson, Michael K., "Whitepaper: Red Hat's New Journaling File System: ext3," pp. 1-13 (2001) printed at http://www.redhat.com/support/wpapers/redhat/ext3/index.html on Sep. 16, 2004.

Kistler, J. *Disconnected Operation in a Distributed File System*, Technical Report CMU-CS-93-156, pp. 1-252 (May 2003).

Kistler et al., Disconnected Operation in the Coda File System, *Proceedings of the 13th ACM Symposium on Operating Systems Principles* (SOSP), pp. 213-225 (Oct. 1991).

Lamport, L., "Paxos made simple," *ACM SIGACT News*, vol. 32, No. 4, pp. 18-25, Dec. 2001.

Liskov, et al., "Replication in the Harp file system," *Proceedings of the 13th ACM Symposium on Operating Systems Principles* (SOSP), pp. 226-238 (Oct. 1991).

Lomet et al., "Efficient and transparent application recovery in client-server information systems," *Proceedings of the 1998 ACM SIGMOD International Conference on Management of Data*, pp. 460-471 (Jun. 1998).

McKusick, et al., "A fast file system for UNIX," *ACM Transactions on Computer Systems* (TOCS), vol. 2, No. 3, pp. 181-197 (Aug. 1984).

Microsoft Corporation, "WinFS Synchronization," 47pgs (2004) printed at http://www.longhorn.msdn.microsoft.com/lhsdk/winfs/conunderstandingwinfssynchronization.aspx printed on Sep. 16, 2004.

Microsoft User Experience Group, "The Windows File System," 21pgs (Oct. 2003) printed at http://msdn.microsoft.com/library/default.asp?url=/library/en-us/snaero/html/wux_topic_storage.asp printed on Sep. 16, 2004.

Mogul, Jeffrey C., *A Recovery Protocol for Spritely NFS*, Technical Report WRL TN-27, DEC Western Research Laboratory, pp. 1-24 (Apr. 1992).

Moss, J., "Working with persistent objects—to swizzle or not to swizzle," *IEEE Transactions on Software Engineering*, vol. 18, No. 8, pp. 657-673 (Aug. 1992).

Muthitacharoen, et al., "A low-bandwidth network file system," *Proceedings of the 18th ACM Symposium on Operating Systems Principles* (SOSP), pp. 174-187 (Oct. 2001).

"Improved Recovery from Partial Page Writes of Data Pages", IBM Technical Disclosure Bulletin, vol. 36, No. 5, May 1, 1993, pp. 141-144.

* cited by examiner

| LSN | Operation |
|---|---|
| 4 | CreateFile(0, "Foo," 0xF015, ...) |
| 5 | WriteFile(17, 256, 53, 0xFF, ...) |
| 6 | CreateFile(0, "Bar," 0xF112, ...) |
| 7 | CloseFile(17, ...) |
| 8 | QueryDir("\Inc," 14, 0, 0, ...) |

*FIG. 5*

| LSN | Operation |
|---|---|
| 4 | CreateFile(0, "Foo," 0xF015, ...) |
| 5 | WriteFile(17, 256, 53, 0xFF, ...) |

*FIG. 6*

| File ID | Lease | Size | Hash | ... |
|---------|-------|------|------|-----|
| 103 | 09:42 | 16210 | E278C1 | ... |
| 1598 | ... | ... | ... | ... |
| ... | 11:14 | 5623 | 10CCD6 | ... |

FIG. 7

| File ID | Version | File Blocks Local | ... |
|---------|---------|-------------------|-----|
| 103 | 54 | {0:33} | ... |
| 1598 | 173 | {0:28, 30:36} | ... |
| ... | ... | ... | ... |

FIG. 8

| SSN | LSNs | Relevant IDs | Invalid IDs |
|-----|------|--------------|-------------|
| 101 | 1:3  | {1598, 3116} | {621}       |
| 102 | 4:5  | {1598, 8664} | { }         |
| ... | ...  | ...          | ...         |

*FIG. 9*

LOSSLESS RECOVERY FOR COMPUTER SYSTEMS WITH MAP ASSISTED STATE TRANSFER

CROSS-REFERENCE TO RELATED PATENT APPLICATIONS

This patent application claims the benefit of U.S. Provisional Patent Application No. 60/583,903, filed Jun. 29, 2004, entitled "Lossless Recovery for Computer System."

FIELD OF THE INVENTION

This invention pertains generally to computer systems and, more particularly, to recovery mechanisms for computer systems.

BACKGROUND OF THE INVENTION

Distributed computer systems have become a popular response to an ever increasing demand for computing system resources. However, the increasing complexity of distributed computer systems has resulted in threats to their robustness and reliability such as resource depletion, Heisenbugs (system bugs that change behavior during debugging), deadlocks and other transient faults. Multiplying the number of servers or, more generally, server replicas (i.e., instances of a server executing simultaneously on multiple computers) provides helpful redundancy but it doesn't solve every robustness and reliability problem. In particular, recovery from component underperformance or outright failure in conventional distributed computer systems may not be possible without excessive disruption of computer system resource users and/or may result in data loss.

Examples of conventional distributed computer systems include the "UNIX" Network Filesystem (NFS) and its variants, the "GOOGLE" File System (GFS), the Calypso file system, the Echo file system, the Harp file system, the Frangipani file system, the Pangaea file system, the Ivy file system and the Coda file system as described in Kistler et al., "Disconnected Operation in the Coda File System," *Symposium on Operating Systems Principles* (SOSP), October 1991 and, more generally, in James J. Kistler, "Disconnected Operation in a Distributed File System," Technical Report CMU-CS-93-156, Carnegie Mellon University, May 1993. For the purposes of this description, distributed computer system components may be categorized as playing a server role (server-side components) or a client role (client-side components). In practical systems, distributed computer system components in a client role may be further categorized as operating at a user-level or a kernel-level. This distinction is particularly relevant to failure recovery mechanisms because failure of kernel-level components is typically more disruptive than failure of user-level components. In addition, kernel-level components are typically required to comply with a different set of operational constraints than user-level components.

Some conventional distributed computer systems provide for lossless restartability of server-side components but not client-side components. Some client-side components may not be transparently restarted, for example, a kernel-level client component failure may require a computer reboot (e.g., computer operating system restart). Some conventional distributed computer systems fail to minimize the complexity of kernel-level client components. Some conventional distributed computer systems incorporate transparently restartable user-level client components but do not provide for lossless restart which may result in the loss of, for example, any computer system resource updates that occurred in the 30 seconds before component failure.

Some conventional distributed computer systems provide for transparent restartability of server-side components but lack broad spectrum fault tolerance that includes, for example, Byzantine fault tolerance as well as fail-stop fault tolerance, such as may be supported by replicated state machine (RSM) architectures. Furthermore, some conventional distributed computer systems fail to provide an effective solution to the problem of underperforming server-side components. In particular, some conventional distributed computer systems that utilize state-based updates (e.g., some systems incorporating server replicas) fail to enable efficient incremental state changes without resorting to, for example, low-level page-based solutions or idiosyncratic solutions applicable only to narrow cases.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, map assisted state transfer may be performed by receiving one or more state updates, marshaling one or more active data-structures into a marshaled shadow, destroying the active data-structures, applying the received state updates to the marshaled shadow and re-instantiating the active data-structures by unmarshaling the marshaled shadow. In an embodiment of the invention, a computer system component is configured to send one or more state update messages including one or more incremental state changes. A potentially different computer system component is configured to receive the state update messages and perform the map assisted state transfer.

In an embodiment of the invention, a data structure includes a marshaled shadow of active data-structures. The active data-structures may include one or more invariance relationships, and the marshaled shadow may be structured to support independence from invariance relationships between the shadows of the active data-structures. The marshaled shadow may be further structured to support the application of one or more incremental state updates to the shadows of the active data-structures, as well as re-instantiation of the active data-structures by unmarshaling of marshaled shadow.

BRIEF DESCRIPTION OF THE DRAWINGS

While the appended claims set forth the features of the invention with particularity, the invention and its advantages are best understood from the following detailed description taken in conjunction with the accompanying drawings, of which:

FIG. 5 is a schematic diagram illustrating an example operations log in accordance with an embodiment of the invention;

FIG. 6 is a schematic diagram illustrating another example operations log in accordance with an embodiment of the invention;

FIG. 7 is a schematic diagram illustrating example resource metadata state in accordance with an embodiment of the invention;

FIG. 8 is a schematic diagram illustrating example local resource state in accordance with an embodiment of the invention;

FIG. 9 is a schematic diagram illustrating an example client message log in accordance with an embodiment of the invention;

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
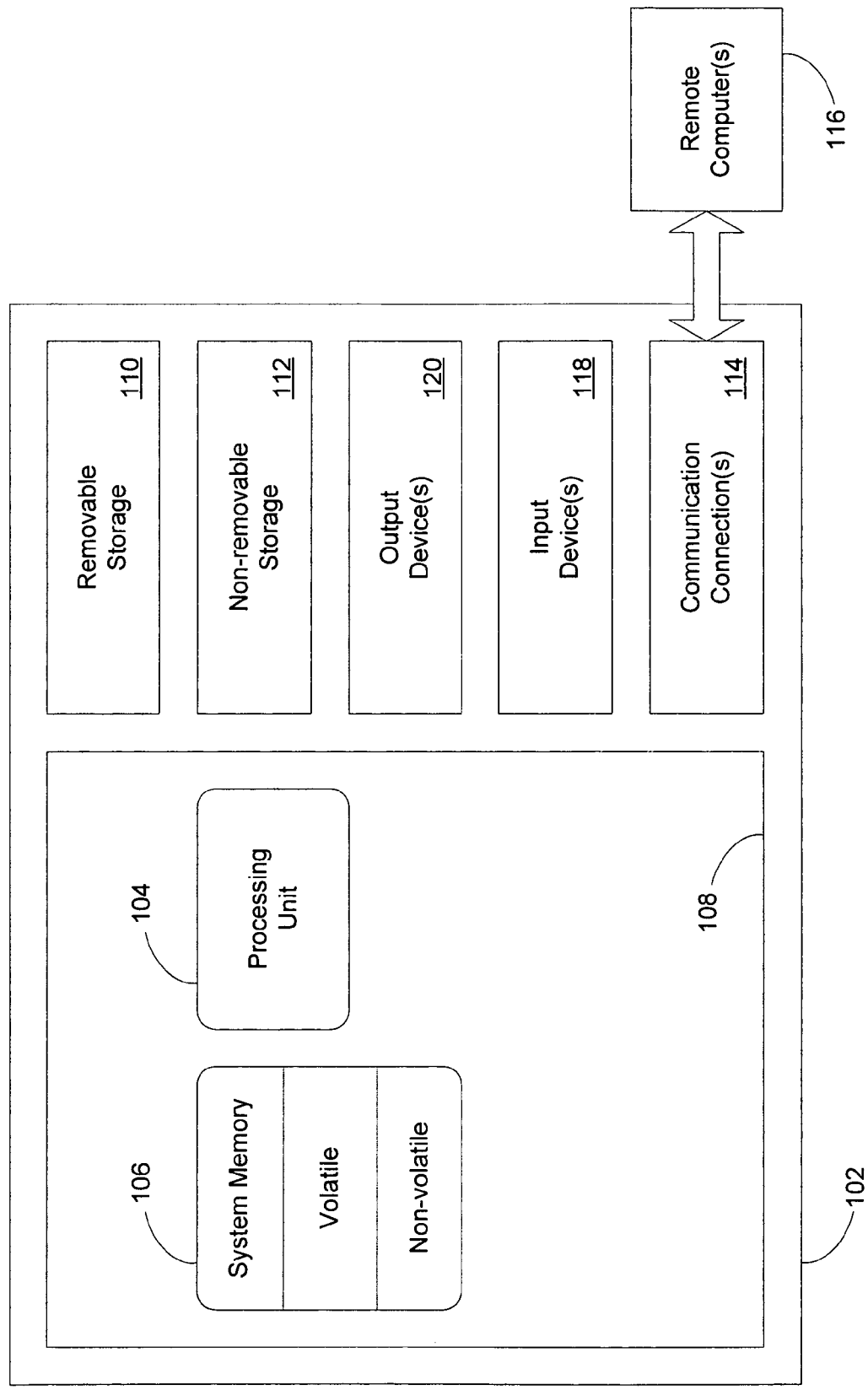
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

Figure 2:
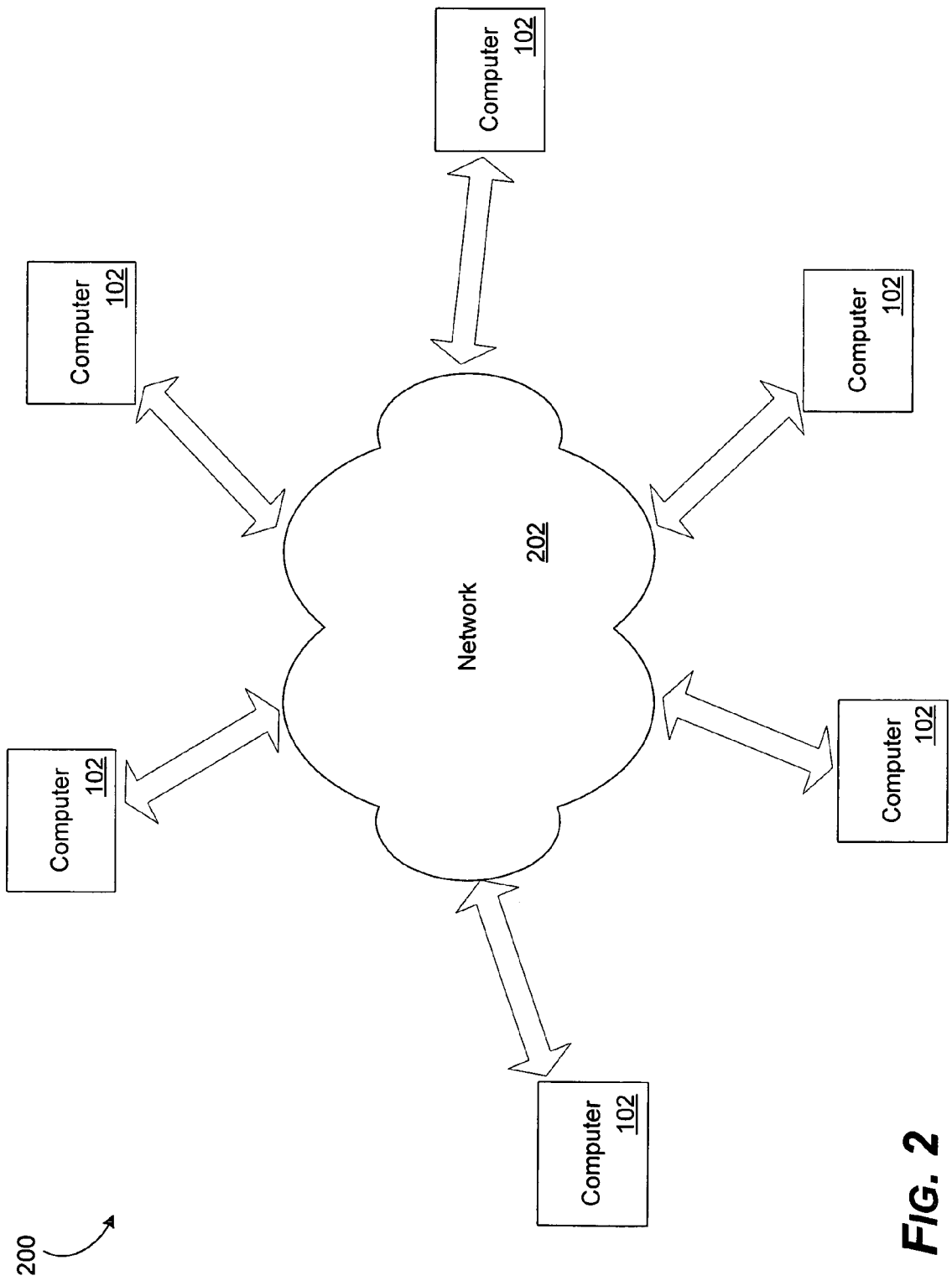
FIG. 2 is a schematic diagram illustrating an example computer networking environment suitable for incorporating an embodiment of the invention.

An example of a computer networking environment 200 suitable for incorporating an embodiment of the invention is described with reference to FIG. 2. The example computer networking environment 200 includes several computers 102 communicating with one another over a network 202, represented by a cloud. Network 202 may include many well-known components, such as routers, gateways, hubs, etc. and allows the computers 102 to communicate via wired and/or wireless media. When interacting with one another over the network 202, one or more of the computers 102 may act as clients, servers or peers with respect to other computers 102. Accordingly, the various embodiments of the invention may be practiced on clients, servers, peers or combinations thereof, even though specific examples contained herein may not refer to all of these types of computers.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a recovery architecture for a distributed computer system allows various components and subsystems to be restarted without losing data. Losslessly restartable distributed computer system components may be employed as a robust mechanism for handling transient faults. In addition, organization into losslessly restartable components and subsystems may ease debugging and testing.

A computer system's client-side user-level subsystem may be losslessly restarted through a combination of database recovery techniques and judicious partitioning of client-side functionality. Resource-storage subsystems may be losslessly restarted through probabilistic replication and lazy recovery processes. In an embodiment of the invention, a resource service subsystem is implemented as a replicated state machine, wherein a replica may be losslessly restarted by transferring state from other replicas. This state transfer may be supported by a practical technique called map assisted state transfer (MAST) that allows a running entity in a distributed system to incorporate incremental state updates from remote entities. The MAST technique may be also utilized in a replicated system in which update logs are truncated, such as the Byzantine file system described in Castro et al., "Practical Byzantine Fault Tolerance," *Operating Systems Design and Implementation* (OSDI), February 1999, or in which state transfer is state-based rather than log-based, such as the Windows File System (WinFS) described in like named sections of the *Microsoft® Windows® Code-Named "Longhorn" Developer Center* and of the *Microsoft Developer Network (MSDN®) Library* dated October 2003.

For clarity and concreteness, examples in this description are generally directed to a particular distributed file system called FARSITE. However, embodiments of the invention are not so limited, as will be apparent to one of skill in the art. Only some features of the FARSITE file system are described below. For additional context and details of the FARSITE distributed file system pertinent to the present application see Adya et al., "FARSITE: Federated, Available, and Reliable Storage for an Incompletely Trusted Environment," OSDI, December 2002.

In an embodiment of the invention, the FARSITE file system is a replicated file system that maintains metadata via state machine replication (e.g., Byzantine or Fail-Stop) and file data via simple replication. Each computer 102 (FIG. 1) in the FARSITE file system may serve in multiple roles including: as a distributed file system client acting on behalf of local applications (i.e., applications located on a same computer 102), as a distributed file system server replica in a server replication group, and as a distributed file system file host that maintains file copies on behalf of remote computers 116.

In an embodiment of the invention, the server subsystem is restartable in a lossless manner since it is a member of a state machine replication group; members of the group may be used to transfer the missing state to a recovering replica. The file host subsystem makes weak assumptions about the consistency between its state and that of the server groups; it uses best-effort replication and low-priority recovery processes to provide probabilistic guarantees for file replication. This strategy is called Tolerable Inconsistency and Lazy Recovery (TILR). The client portion of FARSITE consists of two subsystems, a kernel-level driver and a user-level daemon; the daemon can be restarted losslessly by recovering its state from other subsystems. This strategy is called Remotely Dependent Data Recovery (RDDR).

In contrast to conventional distributed file systems that utilize kernel-level drivers primarily for optimizing file data paths and as a read-only cache of metadata, in an embodiment of the invention, the driver not only caches metadata but also buffers metadata updates in an update log, acting as a staging agent for all modifications done on behalf of applications. These updates are logged by the driver and later sent in batches to the daemon. In an embodiment of the invention, in further contrast to conventional distributed file systems, by extending the write-buffer log across the kernel-user interface and storing appropriate recovery information in the driver and at the server, the user-level client subsystem may recover losslessly from even complete subsystem failure (i.e., subsystem crash requiring restart).

Transactional storage systems (e.g., relational databases) may be utilized for maintaining data structures on disk. However, to ensure that data consistency for more reliable, available, and secure subsystems (e.g., server and driver) does not depend on those with weaker properties (e.g., daemon), in an embodiment of the invention, distributed transactions are not utilized across these subsystems. This isolation has implications in terms of state communication between subsystems. On one hand, exposing a subsystem's uncommitted state to another subsystem complicates the recovery protocols. On the other hand, exposing only committed state across subsystems requires frequent disk I/O, since a subsystem must commit before communicating with another subsystem. Selective exposure of committed and uncommitted state across various subsystems may keep common-case processing overheads low while also keeping the recovery algorithm robust and simple. For example, in an embodiment of the invention, the client driver exposes uncommitted state to the client daemon, the daemon exposes uncommitted state to the server and driver, but the server does not expose uncommitted state.

The distributed file system server may be implemented as a replicated state machine (RSM). In replicated state machines, if one replica's execution falls very far behind that of the other replicas, it may be brought up-to-date by transferring the updated state. However, incorporating incremental state changes in a server replica can be a challenging practical programming task. In an embodiment of the invention, map assisted state transfer (MAST) is utilized to incorporate incremental state changes in a server replica. Map assisted state transfer may be more widely applicable, require less programming effort and more readily facilitate correct and robust implementation than conventional incremental state change implementation techniques such as low-level page-based programming and implementing an idiosyncratic solution that copes with the application. When a recovering server replica utilizing map assisted state transfer receives state updates, the replica marshals its active data-structures into a "marshaled shadow" (in volatile or non-volatile memory 106, FIG. 1), destroys the active data-structures, incorporates the incoming state updates into the marshaled shadow, and unmarshals the modified shadow to re-instantiate the active data-structures. Under map assisted state transfer, the overhead for a programmer may be limited to writing marshaling and unmarshaling routines which may be independent of the data-structure's detailed operational semantics.

Each computer 102 (FIG. 2) in the FARSITE distributed file system may take on one or more of three roles: a distributed file system client, a member of a distributed file system server directory group, and a distributed file system file host.

Figure 3:
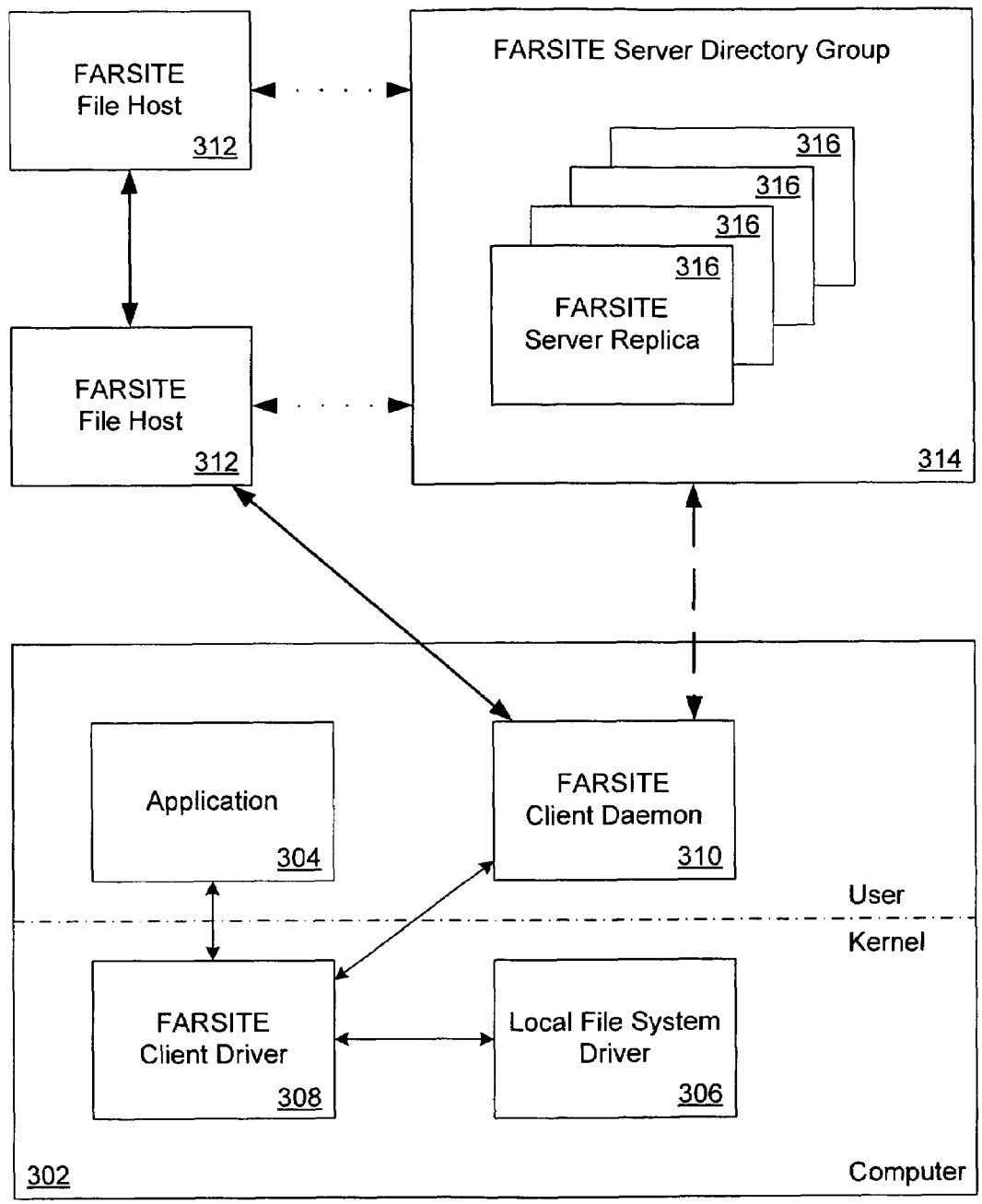
FIG. 3 is a schematic diagram illustrating an example high level computer systems architecture in accordance with an embodiment of the invention.

FIG. 3 depicts an example of a high level computer systems architecture 300 in accordance with an embodiment of the invention. In FIG. 3, a computer 302 includes an application 304, a local file system driver 306, a FARSITE client driver 308 and a FARSITE client daemon 310. The local file system driver 306 and the FARSITE client driver 308 perform at a kernel-level of the computer 302. The application 304 and the FARSITE client daemon 310 perform at a user-level.

The application 304 utilizes the FARSITE client driver 308 to create, read, update and delete files located at FARSITE file hosts 312 and/or on a local file system (i.e., volatile or non-volatile memory 106 of FIG. 1) of the computer 302 accessible with the local file system driver 306. The FARSITE client driver 308 accesses the FARSITE file hosts 312 with the FARSITE client daemon 310. When the FARSITE client driver 308 needs the contents of a particular file (e.g., because the application 304 needs the contents of the file), the client driver 308 requests that the client daemon 310 fetch the contents of the file. The FARSITE client daemon 310 determines which FARSITE file host 312 by querying a FARSITE server directory group 314 that includes one or more FARSITE server replicas 316. A response to the query contains metadata indicating which FARSITE file host 312 has the contents of the particular file. The FARSITE server directory group monitors and controls the FARSITE file hosts 312. The FARSITE client driver 308 and the FARSITE client daemon 310 may be referred to as a FARSITE client or as the client subsystem. The FARSITE server replicas 316 in the FARSITE server directory group 314 may be referred to as a FARSITE server or as the server subsystem.

In an embodiment of the invention, the FARSITE client driver 308 implements a distributed file system interface for the application 304. Example responsibilities of the FARSITE client daemon 310 include managing distributed concurrency leases and hosted file metadata obtained from server replica 316. Distributed concurrency leases ("lease") and hosted file metadata ("metadata") are known in the art so only some of their features are highlighted here. Distributed concurrency leases are part of a mechanism used by the FARSITE distributed file system to coordinate concurrent operations on hosted file objects. For example, one FARSITE client may obtain a lease with a limited duration on a hosted file object for purposes of editing a hosted file thus preventing a second FARSITE client from deleting the hosted file during the period covered by the obtained lease. Examples of hosted file metadata include file names and identifiers, location specification, file size and format, created/modified/accessed times, file attributes such as read-only, hidden, encrypted, compressed and so forth, as well as file permissions and associated security information. File directories or folders may be handled as a type of file or as a file system object with distinct semantics.

In an embodiment of the invention, the server subsystem of FARSITE is implemented as a replicated state machine (RSM). RSM is known in the art so only some of its features are highlighted here. RSM is a general architecture for building fault-tolerant services, wherein multiple replicas of a service run on different machines, with a replication system orchestrating the replicas to act as a single, consistent service. In the RSM model, the service that is replicated acts as a state machine: the service maintains state explicitly, receives operation requests in a sequence, and from its current state and an operation request, deterministically computes a new state and a reply. When discussing the server subsystem, it may add clarity to distinguish between a "server replica" and a "server group". When discussing another subsystem's interactions with a server group, it may be clearer to simply use the term "server."

In an embodiment of the invention, the server manages part of the tree of file system metadata but not the actual file contents. It grants leases and supplies metadata to clients, recalls leases from clients, and accepts operation logs from clients as described in more detail below. The server also coordinates file hosts 312 to control file data replication. The file hosts 312 store replicas of file data at the behest of servers. They also provides access to the file data when requested by a client. The client daemon 310, server, and file host 312 subsystems may reside in the same process. Although this implies that a crash of any subsystem takes down the others with it, this does not compromise the system because the design incorporates lossless fault tolerance and restartability.

In an embodiment of the invention, each subsystem is assumed to be running on an un-trusted computer. In this case the RSM may be implemented using a Byzantine-fault-tolerant protocol. The design easily adapts to an environment with untrusted clients but trusted servers, in which the RSM layer may be replaced with a fail-stop fault-tolerant protocol which tolerates the same number of failures with fewer replicas. Byzantine and fail-stop fault-tolerant protocols are known in the art and need not be described here in detail.

In an embodiment of the invention, the recovery strategy depends on atomicity provided by transactions, for example, with a conventional database or transactional local file system. While FARSITE does not manage on-disk layout, its various components do write data to disk at different times, and hence face a problem analogous to the conventional problem of torn writes. Instead of implementing a careful write-ordering strategy, in an embodiment of the invention, FARSITE relies on transactions for atomicity.

In an embodiment of the invention, FARSITE subsystems commit component-local transactions before exposing their effects to other components. Advantage may be taken of the fact that, in order to provide catastrophic resilience, the RSM protocol commits client requests. As a result, the server does not need to commit its transaction before replying to the client. To avoid unnecessary commits, FARSITE exposes uncommitted state across boundaries where frequent interactions are expected and where the state can be recovered losslessly from other subsystems. In an embodiment of the invention, before the client daemon commits its state, it ensures that the state is consistent. FARSITE avoids requiring remote (or other high-latency) operations to complete in order to reach such a consistent state. Achieving this performance goal requires careful declaration of commit-safepoints to ensure that the committed data is sensible to concurrent tasks.

In an embodiment of the invention, loose coupling enables improved system performance by varying the commit-granularity policy in different parts of the system. The driver, daemon, and server may commit transactions according to their own requirements and policies. The driver may commit once in a few seconds to prevent loss of application data or, for example, when the daemon asks it to. The client may commit at its own pace to reduce recovery time, to reduce jitter, and to help the driver garbage collect its on-disk logs. The server may commit its state transaction (different from the RSM toolkit transaction) very infrequently since a longer recovery time is masked by other replicas that keep the state machine advancing; since FARSITE decouples client and server performance, jitter is less of an issue as well.

In an embodiment of the invention, the FARSITE client driver 308 is made as small as possible with respect to the FARSITE client daemon 310. The FARSITE client driver 308 exports a FARSITE distributed file system application programming interface (API) and manages file and metadata caching to reduce the frequency of kernel-user boundary crossings. In an embodiment of the invention, minimizing driver code size is advantageous for at least two reasons. First, code size is correlated to debugging effort, and user-level code is easier to debug than kernel-level code. Second, code size tends to be correlated to latent bug counts, and a software bug that crashes a driver is likely to crash the computer operating system (OS) as well.

The second point above assumes that it is beneficial for a file-system crash not to take down the OS with it. However, this assumption comes with a caveat: Computer users commonly recognize that when their systems reboot, they might lose the last few seconds or minutes of data they have entered. On the other hand, users do not expect to lose data absent a crash of either the OS or the particular application they are using. However, placing critical code in a daemon opens the possibility that a latent bug might crash the daemon and lose file-system updates without crashing the OS. This may expose system users to a failure mode that is unfamiliar and likely disturbing.

To eliminate this failure mode, the FARSITE client is capable of lossless restart (i.e., no data is lost when the daemon restarts). Rather than achieving losslessness by committing every file-system update, which would be expensive (i.e., in terms of waiting for commits to complete), the client daemon recovers its state with the assistance of other subsystems, using a technique called Remotely Dependent Data Recovery (RDDR). In an embodiment of the invention, the client daemon recovery utilizes state maintained by the client driver and the server.

Figure 4:
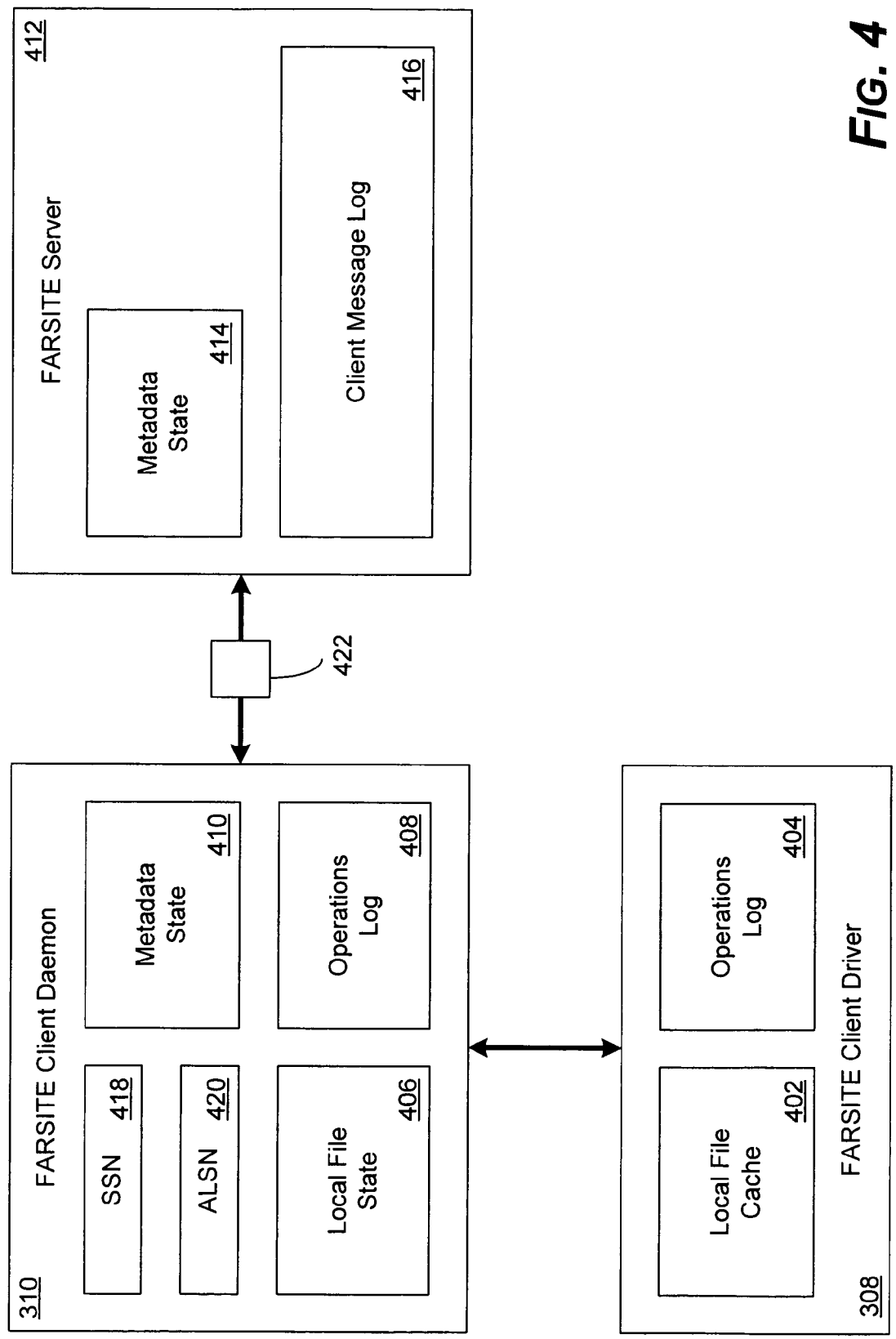
FIG. 4 is a schematic diagram illustrating example details of system components in accordance with an embodiment of the invention.

FIG. 4 depicts example details of components of the high level computer systems architecture 300 of FIG. 3. The FARSITE client driver 308 (FIG. 4) includes a local file cache 402 and an operations log 404. The FARSITE client daemon 310 (FIG. 4) includes a local file state module 406, an operations log 408, a metadata state module 410, an applied log sequence number (ALSN) 420 and a state sequence number (SSN) 418. A FARSITE server 412 (i.e., representing possible multiple components in the FARSITE server directory group 314 of FIG. 3) includes a metadata state module 414 and a client message log 416.

The local file cache 402 contains actual file data managed by the FARSITE client driver 308. The operations log 404 includes file system operations such as file and directory create, read, update and delete operations as well as distributed concurrency lease operations such as lease obtain, release and expire. Each operations log 404 entry is associated with a log sequence number (LSN) incremented by the FARSITE client driver 308.

The local file state module 406 tracks state information for file data stored locally to the FARSITE client daemon 310 including file identifiers, version numbers and ranges of locally stored file blocks. The metadata state module 410 tracks metadata information for files of interest to the application 304 (FIG. 3) regardless of their location including file identifiers, lease specifications including lease expiration times, file sizes, and cryptographic file hashes and checksums. The metadata state module 410 is a partial replica of the metadata state module 414 of the server 412. The operations log 408 of the client daemon is a periodically synchronized partial replica of the operations log 404 of the driver 308.

The client message log 416 of the server 412 includes entries for each message sent from each client 310. Each message corresponds to one or more FARSITE distributed file system operations such as file or directory updates or lease operations. Each message is associated with a state sequence number (SSN) maintained and incremented by the sending client 310. The client message log 416 includes, for each client message, the associated SSN, a range of LSNs associated with the operation(s), a range of file identifiers (relevant file IDs) affected by the operations(s) and possibly one or more file identifiers (invalid file IDs) made invalid by the operation(s).

FIG. 5 schematically illustrates example data contained in the operations log 404 (FIG. 4) of the driver 308. FIG. 6 schematically illustrates example data contained in the operations log 408 of the daemon 310. FIG. 7 schematically illustrates example data managed by the metadata state module 410 of the daemon 310 and the metadata state module 414 of the server 412. FIG. 8 schematically illustrates example data managed by the local file state module 406 of the daemon 310. FIG. 9 schematically illustrates example data contained in the client message log 416 of the server 412. The data shown in these diagrams is for illustrative purposes only and, as will be apparent to one of skill in the art, embodiments of the invention are not so limited.

In an embodiment of the invention, these elements are used as follows during normal operation. When an application 304 (FIG. 3) performs a file-system operation, the details of the operation are recorded in the driver's log 404. In addition, whenever the driver releases a lease, this release is recorded in the driver's log 404. Entries in this log 404 are indexed by a log sequence number (LSN) that is assigned by the driver 308. Periodically (e.g., every 30 seconds), this log 404 is written persistently to disk, so a driver or OS crash will never lose more than a bounded interval of file-system updates. These log 404 entries are pushed from the driver 308 up to the daemon 310 periodically (i.e., to the operations log 408), and, to expedite the server's 412 processing of lease operations, they are also pushed whenever the driver 308 records a lease releases in the log 404.

When the daemon 310 receives a pushed log entry, the daemon 310 records the entry in its own log 408; it applies the operation to its local metadata state 410; and it records the LSN of the entry (called the applied LSN or ALSN 420). In addition, when the daemon 310 releases a lease that it has not forwarded to the driver 308, it records this release in its log 408. Every so often, the daemon 310 atomically commits both its metadata state 410 and its log 408 persistently to disk, but this does not imply that the daemon 310 might lose updates that have not been committed, thanks to the RDDR recovery process. Periodically, or anytime that the log 408 contains a lease release, the daemon 310 sends a batch of log entries in a message 422 to the server 412. These messages 422 are sent serially, and each is indexed by a state sequence number (SSN) 418 that is maintained, incremented and assigned by the daemon 310.

The logs 416 maintained by a server 412 are characteristically different from the logs 404, 408 maintained by clients. Each server replica 316 (FIG. 3) maintains a separate client-recovery log 416 for each client with which it communicates. Each entry in the log 416 corresponds to a message 422 from the client 310, and the entries are thus indexed by SSN 418. Each entry includes a range of LSNs referred to in the message 422, a set of relevant file IDs, and a set of invalid file IDs. When the server 412 receives a message 422 from the client 310, in addition to performing whatever actions are called for by the message 422 (e.g., applying the operations to the metadata state 414), the server 412 also does the following.

For operations except file deletions, the server 412 records as "relevant" any file IDs referred to by the operation. For example, for a file-creation operation, the server 412 records both the ID of the parent directory and the ID of the new file. For messages including file delete operations, the server 412 records as "invalid" the ID of the file being deleted, because the file's metadata will not be valid after the file is deleted. For lease requests, the server 412 records as relevant the file ID whose lease is being granted. For lease releases, the server 412 records as invalid the file ID whose lease is being released, because data regarding this file ID will not be valid once its lease is released. The use of the relevant and invalid file ID sets is described in more detail below.

The system garbage collects logs 404, 408 and 416 as follows. The client driver 308 truncates its log 404 when the daemon 310 performs a commit. The driver 308 discards log 404 entries with LSNs less than or equal to the daemon's 310 committed LSN. The client daemon 310 truncates its log 408 when the server 412 acknowledges a message 422 from the client 310. The daemon 310 discards log 408 entries with LSNs that are referenced in the acknowledged message 422. The server 412 truncates its log 416 when it receives a message 422 from the client. Each client message 422 explicitly indicates the highest SSN that the daemon 310 has persisted in a commit, and the server 412 truncates log 416 records whose SSN is less than or equal to this daemon-persisted SSN.

| | | | | | | |
|---|---|---|---|---|---|---|
| Driver log | | | | 4 | 5 | 6 | 7 |
| Driver log (persisted) | | | | 4 | 5 | 6 | 7 |
| Daemon log | | | | | | | |
| Daemon log (persisted) | 1 | 2 | 3 | | | | |
| Server log | 1 | 2 | 3 | 4 | 5 | | |

| | |
|---|---|
| Daemon SSN | 102 |
| Daemon persistent SSN | 100 |
| Daemon ALSN | 5 |
| Daemon persistent ALSN | 3 |
| Server SSN | 102 |
| Server ALSN | 5 |

The above tables show an example use of the various logs 404, 408 and 416 and values for client recovery. In this example, operations 1-3 were submitted to the driver 308, pushed to the daemon 310, committed by the daemon 310, and sent to the server 412 in message 422 with SSN set to 101. Then, operations 4-7 were submitted to the driver 308 and committed. Of these, operations 4 and 5 were pushed to the daemon 310 and sent to the server 412 in message 422 with SSN set to 102.

The client driver 308 uses a transactional store for its persistent data, and it commits its log 404 in a single transaction. As a result, in an embodiment of the invention, when the driver 308 restarts, its data is in an internally consistent state and no special recovery procedure is needed. Because the driver 308 commits its state periodically, the committed state has a bounded age, so no more than a bounded interval of file-system updates will be lost if the driver 308 restarts. This guarantee is known in the art as bounded persistence.

In supporting driver 308 restartability, dependent commits may become an issue. When the daemon 310 receives state from the driver 308, the daemon's 310 commit of that state becomes dependent on the driver's 308 commit, so the daemon 310 should not commit the state before the driver 308 does. Similarly, when the daemon 310 sends state to the server 412, the server's 412 commit becomes transitively dependent on the driver's 310 commit. Since the server 412 immediately commits every update it receives, the latter constraint implies that the daemon 310 should not send the server 412 any state that the driver 310 has not committed. Similar constraints do not apply to state originating from the daemon 310, because the daemon 310 can recover state from the recipients, as described below.

For embodiments in which no transactional store is available in kernel mode, the daemon 310 may provide the driver 308 with a proxy to a user-mode database. This would keep the driver's log 404 consistent, but it would lose the atomicity of log updates and file-data modifications that the transactional store provides. A partially work around this problem may be having the driver 308 commit a "potentially dirty file" log record before writing to a file then, during recovery, potentially dirty files may be checked for consistency with the log 404, and log corrections can be made post hoc. However, this is only a partial solution because the log 404 contains an authenticated secure hash of the file contents, which is used to guarantee that a computer 302 (FIG. 3) that is compromised after a crash cannot forge file contents. This property would be lost without atomicity of file content and log updates.

When the client daemon 310 restarts, its persistent state either does or does not lag the state of the server 412. These two cases are described separately for clarity, although, in an embodiment of the invention, a recovery code need not explicitly distinguish between the cases.

After the client daemon 310 restarts, it recovers with the help of both the server 412 and the client driver 308. The client daemon 310 reads its persistent state from the local disk, thereby retrieving consistent but slightly stale state. In the example, if the daemon 310 were to restart at this point, it would recover a log 408 containing operations 1-3, and it would recover SSN and ALSN values of 100 and 3, respectively. This state is consistent with the completion of operation 3.

Next, the client daemon 310 sends the server 412 a recovery-assistance request message 422 that includes its recovered SSN and ALSN values. Using these values, the server 412 determines exactly what state information the daemon 310 needs, as follows. The server 412 first initializes two null sets of file IDs: a relevant set and an invalid set. It then walks in order through the elements in its log 416, beginning with the first element beyond the SSN it received from the daemon 310. It adds each element's relevant file IDs to the relevant set, and it removes the element's invalid file IDs from the relevant set. In like manner, it adds the element's invalid file IDs to the invalid set, and it removes the element's relevant file IDs from the invalid set. This procedure ensures that if the log 416 contains a series of alternating lock (or lease) grants and releases for the same file ID, the last entry will win (i.e., be determinate).

The server 412 then sends the client 310 a reply message containing: (1) the metadata and lease state for relevant file IDs, (2) the set of invalid file IDs, (3) the server's 412 stored value of the daemon's SSN (i.e., as determined from the client message log 416), and (4) the server's 412 stored value of the daemon's ALSN (i.e., as determined from the client message log 416). When the client daemon receives this message, it incorporates the state and deleted file IDs into its locally recovered state 406, using the map assisted state transfer (MAST) mechanism described below. It truncates its log 408 by removing entries with LSNs less than or equal to the ALSN received from the server 412. In the example, this would empty the log. It updates the values of its SSN 418 and ALSN 420 to those received from the server 412, but only if they are greater than the values recovered locally. In the example, these values are updated to 102 and 5, respectively.

At this point, the daemon's 310 state is consistent with the server's 412 state, but it is still not consistent with the state of the driver 308, mainly because the daemon's 310 information about locally stored files is stale. Next then, the daemon 310 asks the driver 308 to re-push all logged operations with LSNs greater than the daemon's 310 persistent ALSN but not greater than its updated ALSN 420. The daemon 310 applies these operations to its local file state 406, but it does not record them in its log 408. In the example, the daemon's 310 persistent ALSN is 3 and its updated ALSN is 5, so the driver 308 pushes operations 4 and 5. At this point, the daemon 310 has completely recovered, and it resumes normal operation. For the example system, the state has returned to that illustrated in the above tables.

| Driver log | | | | | | | 7 |
|---|---|---|---|---|---|---|---|
| Driver log (persisted) | | | | 4 | 5 | 6 | 7 |
| Daemon log | | | | | | 6 | |
| Daemon log (persisted) | | | | | | 6 | |
| Server log | 1 | 2 | 3 | 4 | 5 | | |

| Daemon SSN | 102 |
|---|---|
| Daemon persistent SSN | 102 |
| Daemon ALSN | 6 |
| Daemon persistent ALSN | 6 |
| Server SSN | 102 |
| Server ALSN | 5 |

The above tables illustrate an example of what happens if, before the daemon 310 crashes and restarts, the driver 308 pushes operation 6 to the daemon 310, which then commits its state. In this case, the recovery proceeds slightly differently. The server 412 performs the same procedure, but since it has no recovery records with SSN values greater than 102, it sends null sets of metadata state and invalid IDs to the client 310, and therefore the client daemon 310 has no state-incorporation work to do. The daemon 310 still truncates its log 408 by removing entries with LSNs less than or equal to the server's 412 stored ALSN for the client 310. In the example, this removes entries 1-5, leaving only operation 6. However, the daemon 310 does not update the values of its SSN 418 or ALSN 420, since the values received from the server 412 are not greater than its locally recovered values.

If, in an embodiment of the invention, the FARSITE code is written using threads and fine-grained locking, it would be natural to create a separate transaction for each thread and to commit the transaction when the thread completes a task, thereby ensuring that the transaction commits consistent state. However, in an embodiment of the invention, to simplify concurrency management, the FARSITE code is written in an event-driven style, wherein each task monopolizes the central processing unit (CPU) (e.g., processing unit 104 of FIG. 1) until it explicitly yields when it reaches a blocking point (typically an I/O operation). Employing multiple concurrent transactions in such an embodiment would entail several complications. Concurrent transactions may require additional concurrency control beyond that implicit in event-driven code. Since pessimistic concurrency control interacts badly with event-driven code, an optimistic concurrency control mechanism would be required. Since performing a database commit at the end of each task would be prohibitively expensive, an in-memory transactional store, such as recoverable virtual memory (RVM), would be desirable.

Although the above approach is workable, in an embodiment of the invention, a different route is chosen. Each subsystem maintains a single transaction for its tasks, and, every so often, this single transaction is committed and a new transaction is started. This approach entails two problems, the first of which is how to ensure that the state of each task is consistent at the moment of commit. In an embodiment of the invention, a solution to this first problem gives rise to a second problem, which is how to prevent an excessive delay before the commit occurs.

Whenever a task resumes from a blocking point, it should verify its current state, and if the state is found to be inconsistent, the task should restart. With this code pattern in place, each subsystem runs a periodic commit task whose job is to commit the current transaction and start a new one. The code pattern ensures that committed state is effectively consistent. However, not all event-driven code in an embodiment follows this pattern strictly, so some work is required to ensure consistency.

By code inspection, it may be determined which blocking points follow the resume-verify-restart pattern, and these points may be tagged as commit-safe. When each task begins execution or resumes from a commit-safe blocking point, it acquires a nonexclusive commit lock; when the task terminates execution or reaches a commit-safe blocking point, it releases the lock. Before the commit task performs its commit operation, it acquires an exclusive commit lock, which conflicts with the commit locks held by the other tasks. The commit lock is managed in much the same manner as a single-writer/multiple-reader lock, and it may ensure that no task is at an unsafe blocking point at the time of the commit.

Since the commit task waits until other tasks are at commit-safe blocking points, the commit could potentially be delayed by a very long time. Steps may be taken to prevent this. By code inspection and modification, it may be ensured that remote-operation blocking points are commit-safe. By profiling under a heavy load, blocking points responsible for high commit delays may be identified and they may be inspected and/or modified to ensure that they are commit-safe.

In an embodiment of the invention, the server subsystem of FARSITE is built on top of a replicated state machine (RSM) service using a conventional RSM toolkit such as that described in Rodrigues et al., "BASE: Using Abstraction to Improvie Fault Tolerance," *SOSP*, October 1991. In an RSM, a replica may fall far behind its peers, or a new replica may join a replica group with a clean slate. In either situation, it may be impractical to advance the replica by replaying the operation history that it missed, because storing and transferring a history that grows without bound is impractical. Instead, the RSM substrate requires the subsystem to emit and accept state-based updates.

In an embodiment of the invention, the RSM toolkit requires the subsystem to express its state as an array of marshaled objects. It makes three upcalls to the subsystem, and it provides one downcall. The downcall is modify, which warns the toolkit to take a preimage of an object before the subsystem modifies its state. The upcalls are: "execute," which indicates an operation request has arrived and instructs, for example, the FARSITE server subsystem to execute it. In the absence of state transfer, only this call is used. "get_obj," which asks the subsystem for the marshaled state of an object with a given array index. This call is used for extracting state from an up-to-date replica. And "put_obj," which instructs the subsystem to update an indexed object with new marshaled state. This call injects a marshaled state object into the subsystem on a laggard replica, which is responsible for incorporating the object into its working state.

The practical challenge of incorporating state has not been adequately addressed in conventional systems. For comparison and contrast with the MAST technique, conventional ways to organize data structures to support state incorporation are first described: opaque pages, incorporation-aware classes, raw interfaces, hybrid interfaces, and runtime interfaces.

In the opaque pages technique, the subsystem is programmed directly against the low-level array-of-objects interface provided by the RSM toolkit. In this approach, each state object is a memory page, and the state array is the memory address space. Manually laying out objects in memory is painful and abandons the compiler support designed to do object manipulation. Even assuming language support for controlled object layout, this approach requires a common address space among replicas, which may interact badly with heterogeneous distributed systems.

In the incorporation-aware classes technique, the subsystem's data structures are designed to be aware of state incorporation from the beginning. While this approach is sometimes sensible, it conflicts with the goals of modularity and encapsulation. Because incorporation must handle the interactions among all objects, an incorporation-aware design necessarily considers all such interactions together.

In the raw object interfaces technique, data structures are designed with a set of raw interfaces for state incorporation, disjoint from the runtime interfaces used by the subsystem's algorithms. Using only raw interfaces, it is difficult to navigate the object graph to place incoming state. It is also difficult to replace state incrementally. What should be done with disconnected object references, and what should be done with incoming state that refers to an object not yet reconstructed? Each question must be answered anew for each raw interface on each class.

In the hybrid object interfaces technique, raw interfaces are provided for injecting state into a local object, but runtime interfaces are used to navigate the object graph. This solution addresses the first problem with raw interfaces but introduces a worse problem. The runtime interfaces rely on invariants in the data structure that are not maintained by the arbitrary incremental replacement of state. Working around those invariants is class-specific and pollutes the design of the runtime interfaces with awareness of state-incorporation requirements.

In the runtime object interfaces technique, state is incorporated using only the runtime object interfaces. In this approach, used by the BASE RSM toolkit, a method accepts an array of marshaled objects, and makes a series of calls on the runtime object interfaces to transform its state into that represented by the marshaled objects. The worst problem with this approach is that it requires inferring a sequence of operations that produce an arbitrary state. This task is not achievable in general, and when it is, it requires deep knowledge of the subsystem's properties. A small change to the runtime calling protocol could result in a dramatic change to the operation-sequence inference algorithm. Another problem is that the approach requires transmitting and considering the entire state update all-at-once, not incrementally. Otherwise, the inference algorithm may be unable to construct an operation sequence that can produce the partial state. For systems with state larger than core, the inference algorithm must produce a sequence with the further constraint of disk-friendliness.

In addition to the problems mentioned with each approach, none of these conventional techniques are well suited to adapting existing legacy code for use in an RSM. The map assisted state transfer (MAST) technique relieves the problems described above. The MAST technique is applicable to other contexts, as well, for example, it can be used in systems where replicas synchronize via state-based updates such as WinFS.

In an embodiment of the invention, the code requirements for each class may be limited to marshaling and unmarshalling routines and the use of a pointer-swizzling strategy, for example, all-at-once swizzling for subgraphs of the object graph, references using non-pointer keys, or lazy swizzling. These techniques are known in the art and often already available for other purposes, such as persistence or out-of-core operation. Furthermore, they can often be written with only local and fairly limited understanding of a class's dynamic behavior.

Broadly, in MAST, incoming state is incorporated into a "marshaled shadow" of the objects on the receiving replica, rather than into the runtime object graph. This shadow may be maintained in volatile or non-volatile memory 106 (FIG. 1). MAST maintains a shadow map that maps between keys and the shadowed objects. This map facilitates object placement without class-specific object-graph navigation.

Earlier conventional RSM toolkits require a dense linear key space, treating the state as an array of blobs. For convenience, in an embodiment of the invention, the RSM toolkit may be modified or implemented such that it allows each subsystem class to choose an independent, sparse, and programmer-defined key space. Before incorporating incoming state, the RSM ceases calling execute, and the state machine quiesces. MAST may then follow these steps:

1. Marshal all objects into the shadow, a collection of blobs.
2. Discard the in-memory runtime representations.
3. As put_obj supplies each incoming blob, use the associated key to insert or update the shadow. A key with an empty blob indicates a deletion.
4. Reconstruct the in-memory state from the shadowed blobs using the objects' unmarshaling constructors.

In an embodiment of the invention, the MAST technique has several advantages including that it works well with conventional object-oriented design, for example, it may be utilized to adapt persistence-aware but incorporation-unaware classes with minimal invasion. It may sidestep the problems of object-graph-navigation and invariants in runtime interface invariants by utilizing standard marshaling and swizzling (which may already be present). Swizzling may be made easier by allowing classes to use flexible, independent key spaces. It may incorporate state directly, rather than inferring runtime operations that should produce the desired state. In addition, it may be well-suited to incremental and out-of-core operation.

In an embodiment of the invention, the distributed file system classes may be marshaled into relational database tables. The database provides persistence, useful transactional semantics, and efficient indexing to support out-of-core operation. Each class may be marshaled to its own table, and the primary key for the table may be utilized as the class-specific shadow map key. Because the database table is considered the marshaled representation and not the runtime representation, database integrity constraints (such as foreign-key constraints) are not necessary. In an embodiment of the invention, this reflects the MAST strategy of exploiting invariance-freedom in the marshaled representation.

A "catastrophic event" is one that violates the RSM assumption that no more than 'f' machines fail at once, for example, a power outage that causes every replica to crash and restart. In an embodiment of the invention, to recover from such an event requires two conditions. The persistent state stored on each server is required to be consistent, and this state is required to reflect operations that have been exposed to other subsystems.

The consistency condition is required because in general it is difficult to recover from an arbitrary or inconsistent state. In an embodiment of the invention, consistency of the persistent store is achieved by committing updates on boundaries between operation executions. For example, a long-running transaction may be utilized to perform 50 RSM operations in-memory with MAST tracking the list of created, updated, and deleted objects. Performing operations in-memory may absorb IPC traffic to the database server. Because a transaction is open, it is possible to push objects out-of-core, even in the course of an operation. When the batch ends, the remaining updates may be written and the transaction committed. The transaction may ensure that a restarted system sees a consistent state on an operation boundary.

The state-exposure condition seems to demand that we commit the state after every operation, before transmitting the reply to the client. However, as part of its solution to catastrophic-failure recovery, the RSM toolkit persistently records a log of operations that it has scheduled for execution. That log is sufficient to reconstruct the RSM state from the point of the last state commit. After restoring the state to the most-recent commit, the RSM may utilize the ordinary execute call to reconstruct the most-recent state.

In an embodiment of the invention, the file host subsystem uses a tolerable inconsistency and lazy recovery (TILR) strategy for maintaining its persistent state. Unlike the client and the server subsystems, the file host may perform its work in a best-effort fashion. When it restarts, it need not try to ensure that its state is strongly consistent with that of any other components. Instead, it may rely on background processes to eventually catch and repair inconsistencies.

The job of a file host includes replicating and storing file contents, under direction of server groups. A file host's state may include a set of file replicas, a catalog of replica metadata, a queue of pending work, and a queue of work in progress. Except for the file replicas, which are stored in the file host's local file system, all of this state may be stored in a local database. To keep the database internally consistent, in an embodiment of the invention, updates to the database are transactional. However, there need not be transactionality between the database and the file system, and, in addition, there need not be tight coupling between the file host and any server group.

As a result of this loosely coupled design, the file host's local file system may become out-of-sync with its local database, or the local database may become out of sync with the instructing server group's state. For example, a file host might finish the work of copying a file but then crash before it updates its replica metadata catalog to reflect the new copy, or it may crash before it tells the server about the copy.

To address such inconsistencies, the file host may periodically scan through its stored file replicas. For each replica it finds, it may check its local database to ensure that the replica is listed in its catalog. If it is not, the replica is discarded. If the replica is listed in the catalog, the file host then communicates with the server group indicated by the replica metadata to ensure that the replica is credited and still wanted by the server group. If it is not wanted, in an embodiment of the invention, the replica is discarded. If it is wanted but not credited, the server group may update its state to reflect the fact that the file host does hold a copy.

Figure 10:
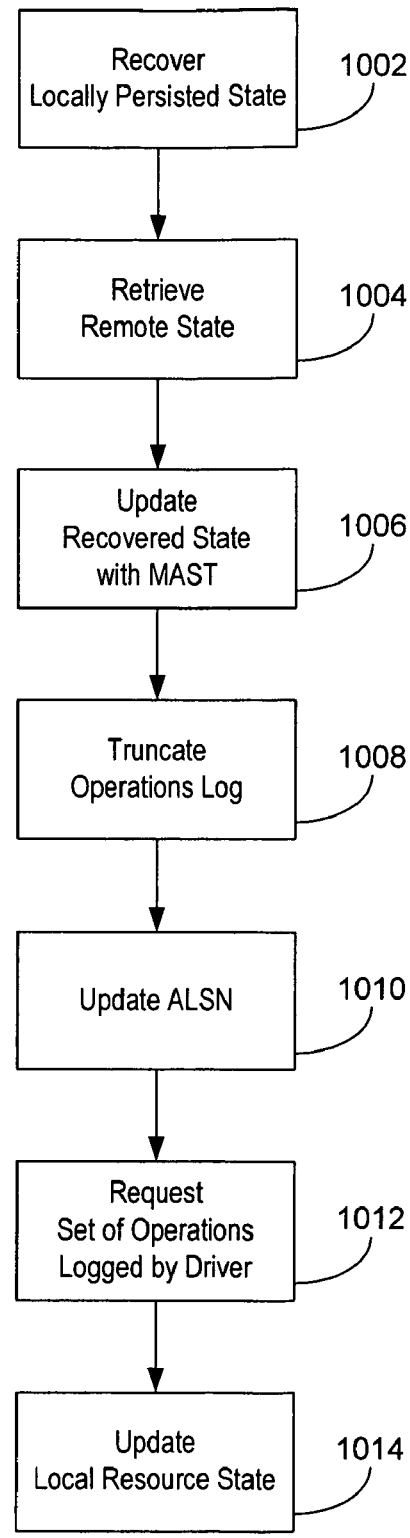
FIG. 10 is a flowchart depicting example steps for lossless recovery in accordance with an embodiment of the invention.

FIG. 10 depicts example steps for lossless recovery in accordance with an embodiment of the invention. For example, the steps depicted by FIG. 10 may be performed by the client daemon 310 (FIG. 4). At step 1002, a locally persisted state may be recovered. For example, the client daemon 310 may read its persisted state from a local storage such as removable storage 110 or non-removable storage 112 (FIG. 1). The locally persisted state may include any of a local resource state such as the local file state 406, the operations log 408, the metadata state 410, the SSN 418 and/or the ALSN 420. The recovered state may be stale, that is, some state loss may have occurred compared to the state before the event requiring recovery.

At step 1004, remote state may be retrieved. For example, the client daemon 310 (FIG. 4) may retrieve state from the server 412. Remote state retrieval is described in more detail below with reference to FIG. 11. At step 1006, some or all of the recovered state may be updated with the retrieved remote state utilizing map assisted state transfer (MAST). For example, the client daemon 310 may utilize MAST to update the local file state 406 with the retrieved remote state.

At step 1008, the operations log 408 (FIG. 4) may be truncated. For example, the client daemon 310 may remove entries from the operations log 408 associated with log sequence numbers less than or equal to an applied log sequence number in the retrieved remote state. At step 1010, the applied log sequence number 420 may be updated, for example, the applied log sequence number 420 may be updated to the applied log sequence number in the retrieved remote state if the applied log sequence number 420 is less than the applied log sequence number in the retrieved remote state. The value of the applied log sequence number 420 prior to update may be stored for later reference.

At step 1012, a set of operations logged by the client driver 308 (FIG. 4) may be requested. For example, the client daemon 310 may request that the client driver 308 re-push operations in its operations log 408 associated with log sequence numbers in a range between the recovered value of the applied log sequence number 420 and the updated value of the applied log sequence number 420. At step 1014, a local resource state such as the local file state 306 may be updated with the operations pushed by the client driver 308 as a result of the request in step 1012. The client daemon 310 may be fully recovered following the update of step 1014.

Figure 11:
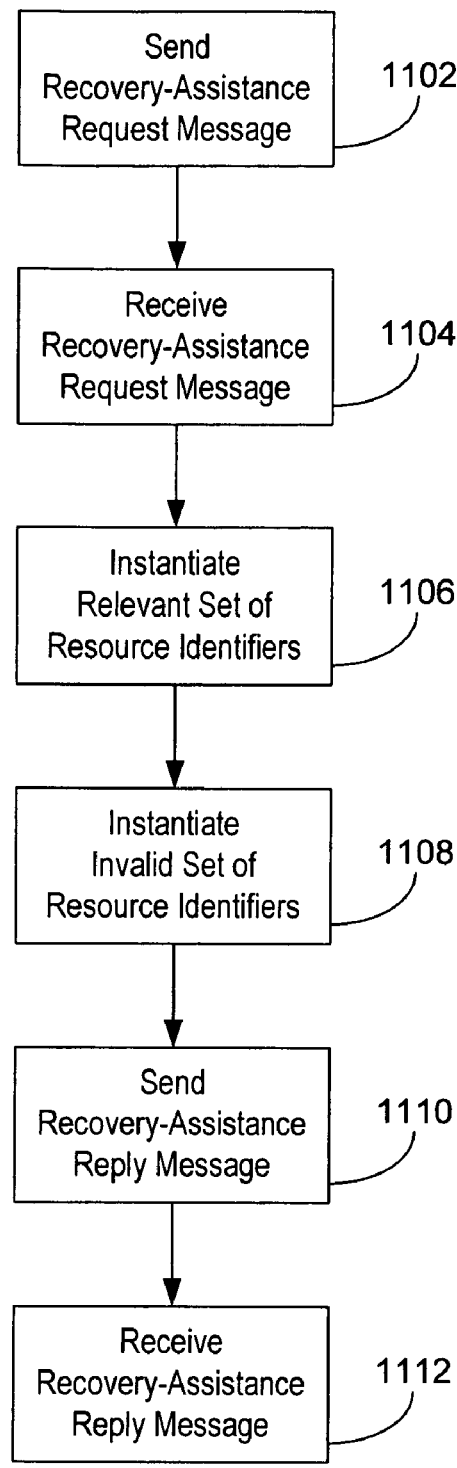
FIG. 11 is a flowchart depicting example steps for retrieving remote state in accordance with an embodiment of the invention.

FIG. 11 depicts example steps for retrieving remote state in accordance with an embodiment of the invention. For example, the steps depicted by FIG. 11 may be performed by the client daemon 310 (FIG. 4) and the server 412. At step 1102, the recovery-assistance request message 422 may be sent. For example, the client daemon 310 may instantiate and send the recovery-assistance request message 422 to the server 412. The recovery-assistance request message 422 may include the SSN 418 and the ALSN 420.

At step 1104, the recovery-assistance request message 422 (FIG. 4) may be received. For example, the server 412 may receive and parse the recovery-assistance request message 422. At step 1106, a relevant set of resource identifiers may be instantiated and at step 1108 an invalid set of resource identifiers may be instantiated. In an embodiment of the invention, step 1108 is incorporated into step 1106. For example, the server 412 may initialize the relevant and invalid sets of file identifiers by considering elements in its client message log 416 beginning with the entry corresponding to the SSN 418 contained in the recovery-assistance request message 422.

At step 1110, the recovery-assistance reply message 422 may be sent. For example, the server 412 (FIG. 4) may instantiate and send the recovery-assistance reply message 422 to the client daemon 310. The recover-assistance reply message 422 may include resource metadata and lease state for relevant resource identifiers, the set of invalid resource identifiers, the server's 412 stored value of the daemon's SSN 418, and the server's 412 stored value of the daemon's ALSN 420 (e.g., as determined from the client message log 416). At step 1112, the recovery-assistance reply message 422 may be received. For example, the client daemon 310 may receive and parse the recovery-assistance reply message 422. The information contained in the recovery-assistance reply message 422 may then be utilized in subsequent steps such as step 1006 of FIG. 10.

Figure 12:
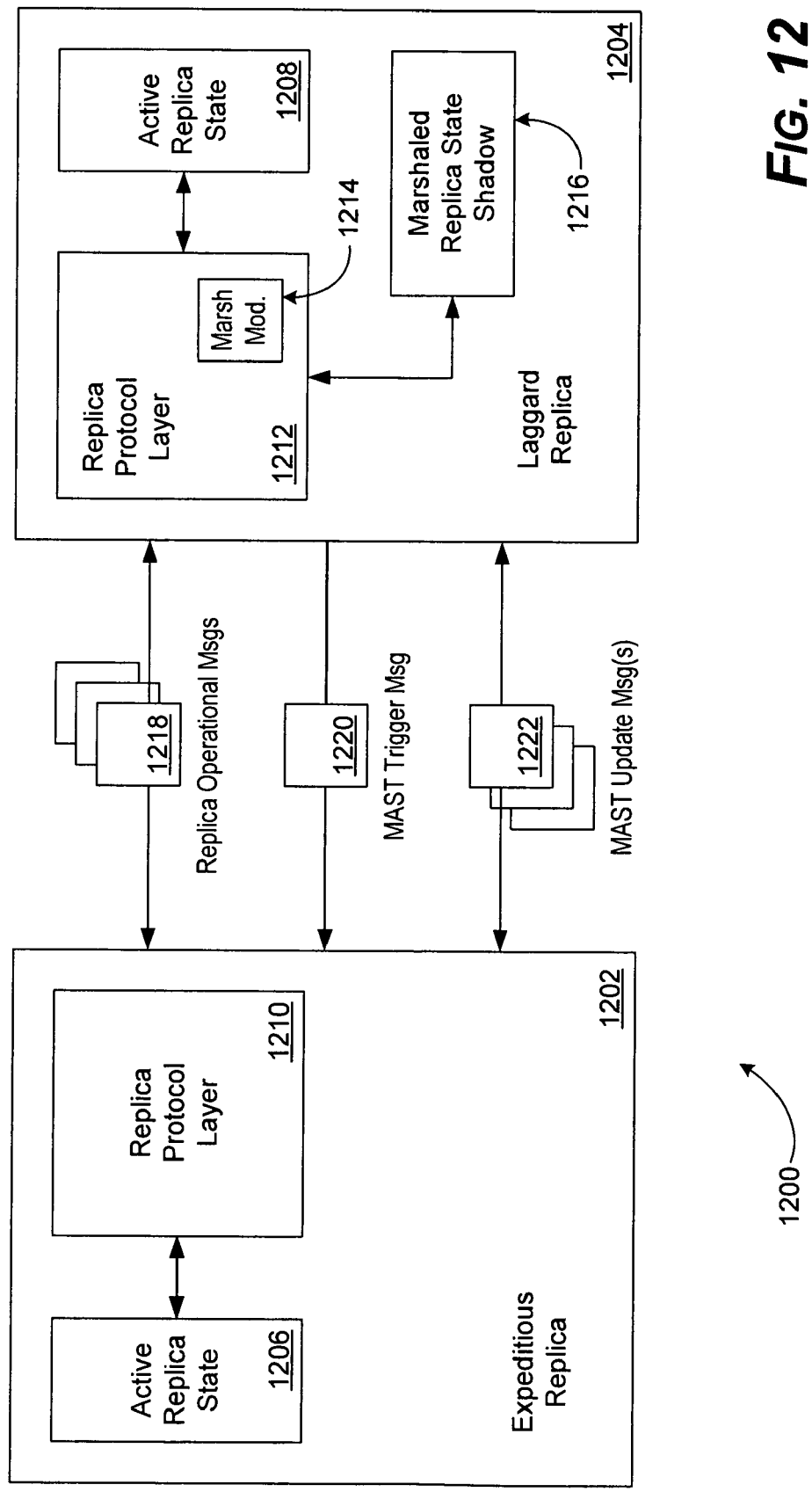
FIG. 12 is a schematic diagram illustrating aspects of an example map assisted state transfer architecture in accordance with an embodiment of the invention.

Incorporating incremental state changes into active data-structures may be challenging in practice, for example, because of a need to avoid violating active data-structure invariants. Map assisted state transfer (MAST) may be utilized to overcome the challenges of active state update. FIG. 12 illustrates aspects of an example map assisted state transfer architecture 1200 in accordance with an embodiment of the invention.

The map assisted state transfer architecture 1200 includes an expeditious replica 1202 component and a laggard replica 1204 component, each maintaining an active replica state 1206, 1208 data-structure and having a replica protocol layer 1210, 1212 module. The replica protocol layers 1210 and 1212 may be identical or they may differ, for example, in version. The replica protocol layer 1212 is shown in FIG. 12 as including a marshal/unmarshal module 1214. The laggard replica 1204 is shown as including a marshaled shadow 1216 of the active replica state 1208, that is, the marshaled replica state shadow 1216. Of course, the expeditious replica 1202 may include a marshaled replica state shadow (not shown in FIG. 12 for clarity) if it should become laggard with respect to some other replica.

A goal of each replica 1202 and 1204 may be to seek to maintain identical active replica states 1206 and 1208. For example, replica 1204 may be informed of changes to active replica state 1206 and replica 1202 may be informed of changes to active replica state 1208. In normal operation, information about such changes are carried between each replica 1202 and 1204 by replica operational messages 1218. For example, if the active replica state 1206 includes a file directory and one of the files in the directory is renamed then one of the replica operational messages 1218 sent to the replica 1204 may include a specification of the file rename operation. However, this operation-by-operation replication of state may be computationally expensive. As a result, some replica in a replica network may lag others, for example, because they are slower (have access to less computational resources such as processor time or bandwidth) or because of component failure (being "offline" for a period).

The replication lag may reach a point where the laggard replica 1204 determines that normal operation is insufficient to reduce the lag to an acceptable level. The laggard replica 1204 may then initiate map assisted state transfer (MAST). Map assisted state transfer may include marshaling the active state replica 1208 into the marshaled replica state shadow 1216, sending a MAST trigger message 1220 to the expeditious replica 1202, receiving MAST update messages 1222 containing one or more incremental state updates (or MAST updates), applying the incremental state updates to the marshaled shadow 1216 and then re-instantiating the active replica state 1208 from the updated marshaled shadow 1216. Map assisted state transfer may be more efficient than operation-by-operation replication of state thus enabling the laggard replica 1204 to reduce lag to an acceptable level. Moreover, map assisted state transfer may enable lag reduction when operation-by-operation replication is no longer an option such as when some or all of the operations log at the expeditious replica 1202 becomes unavailable, for example, because the operations log has been truncated or otherwise limited in size. In such circumstances, map assisted state transfer may provide for incorporation of some or all of the active replica state 1206 into the active replica state 1208. Following map assisted state transfer, the active replica state 1208 may match the active replica state 1206.

Example details of active replica state 1206 and 1208 and the marshaled replica state shadow 1216 are described below with reference to FIG. 13. For example, the marshaled shadow 1216 may include shadowed versions of active replica state 1208 objects and a shadow map that facilitates insertion and/or update of shadowed objects independent of the class-specific object-graph navigation required for such operations on the active replica state 1208. The replica protocol layer modules 1210 and 1212 may create, instantiate, format, send, receive, parse and/or destroy replica operation messages 1218, MAST trigger messages 1220 and MAST update messages 1222. The marshal/unmarshal module 1214 may create, instantiate, format and/or update the marshaled shadow 1216 with data from the active state 1208 as well as creating, re-instantiating, formatting and/or updating the active state 1208 with data from the marshaled shadow 1216. The marshal/unmarshal module 1214 may also read, delete and/or destroy the active state 1208 and its marshaled shadow 1216.

The active replica state 1208 may include active data-structures having invariance relationships, for example, relationships that, if violated, make the active replica state 1208 inconsistent. The marshaled replica state shadow 1216 may include shadows (e.g., transforms) of the data-structures of the active replica state 1208 that are independent of invariance relationships. The marshaled shadow 1216 may be unconstrained by the invariance relationships of the active state 1208, in particular, in terms of suitable types of update.

Figure 13:
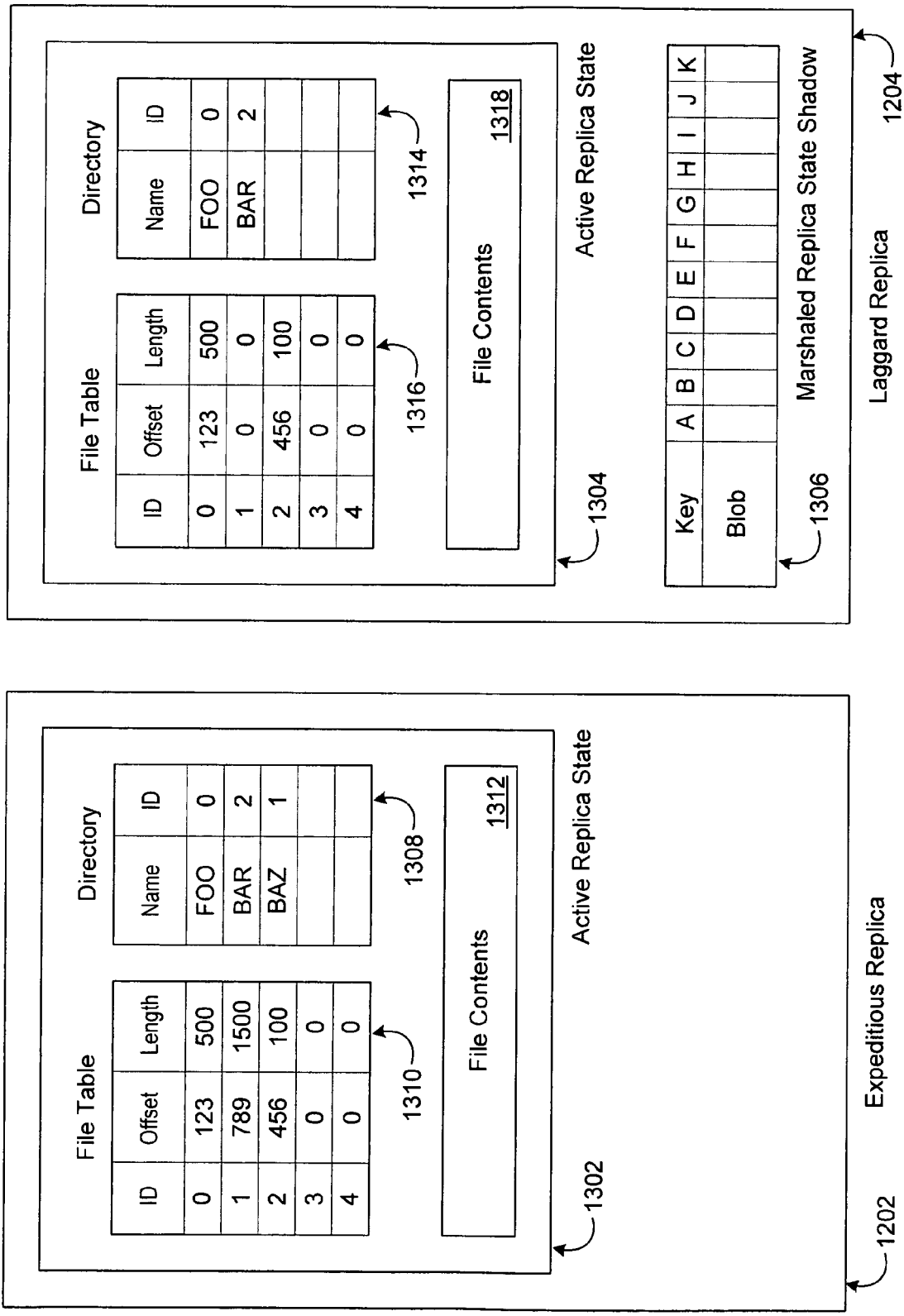
FIG. 13 is a schematic diagram illustrating example map assisted state transfer details in accordance with an embodiment of the invention.

FIG. 13 illustrates example details of the active replica states 1206 and 1208 (FIG. 12) and the marshaled replica state shadow 1216 in accordance with an embodiment of the invention. The expeditious replica 1202 of FIG. 13 has an active replica state 1302 corresponding to the active replica state 1206 of FIG. 12. The laggard replica 1204 of FIG. 13 has an active replica state 1304 and a marshaled replica state shadow 1306 corresponding to the active replica state 1208 and the marshaled replica state shadow 1216, respectively, of FIG. 12.

The active replica state 1302 includes a file directory 1308, a file table 1310 and a file contents 1312 area. The active replica state 1304 likewise includes a file directory 1314, a file table 1316 and a file contents 1318 area. The file directories 1308 and 1314 include filenames and file identifiers (IDs). Each filename corresponds to a file identifier. The file tables 1310 and 1316 include file identifiers, file offsets and file lengths. Each file identifier is associated with a file offset and a file length. The file length indicates a length of a file (e.g., in bytes) in the file contents area 1312 or 1318. The file offset indicates where the file begins in the file contents area 1312 or 1318. The marshaled replica state shadow 1306 includes a shadow map of keys (e.g., cryptographic hashes represented by letters in FIG. 13) to blobs (binary large objects, e.g., marshaled shadows of active replica state 1304 data-structures).

In the example depicted by FIG. 13, an invariance relationship exists between the file directory 1308 and the file table 1310, that is, file table entries (rows) must have corresponding file directory entries and vice versa. The same invariant holds for the data-structures of the active state replica 1304. In this example, a file with file ID 1 (i.e., "BAZ") has been added to the active replica state 1302 but not yet to the active replica state 1304. In normal operation, the active replica state 1304 may be updated with one or more replica operational messages 1218 (FIG. 12). During a map assisted state transfer, the active replica state 1304 may be synchronized by marshaling the active state replica 1304 into the marshaled replica state shadow 1306, applying one or more incremental state updates received in MAST update messages 1222 to the marshaled shadow 1306, and then re-instantiating the active state replica 1304 from the updated marshaled replica state shadow 1306. The procedure is described in more detail below with reference to FIG. 14.

Figure 14:
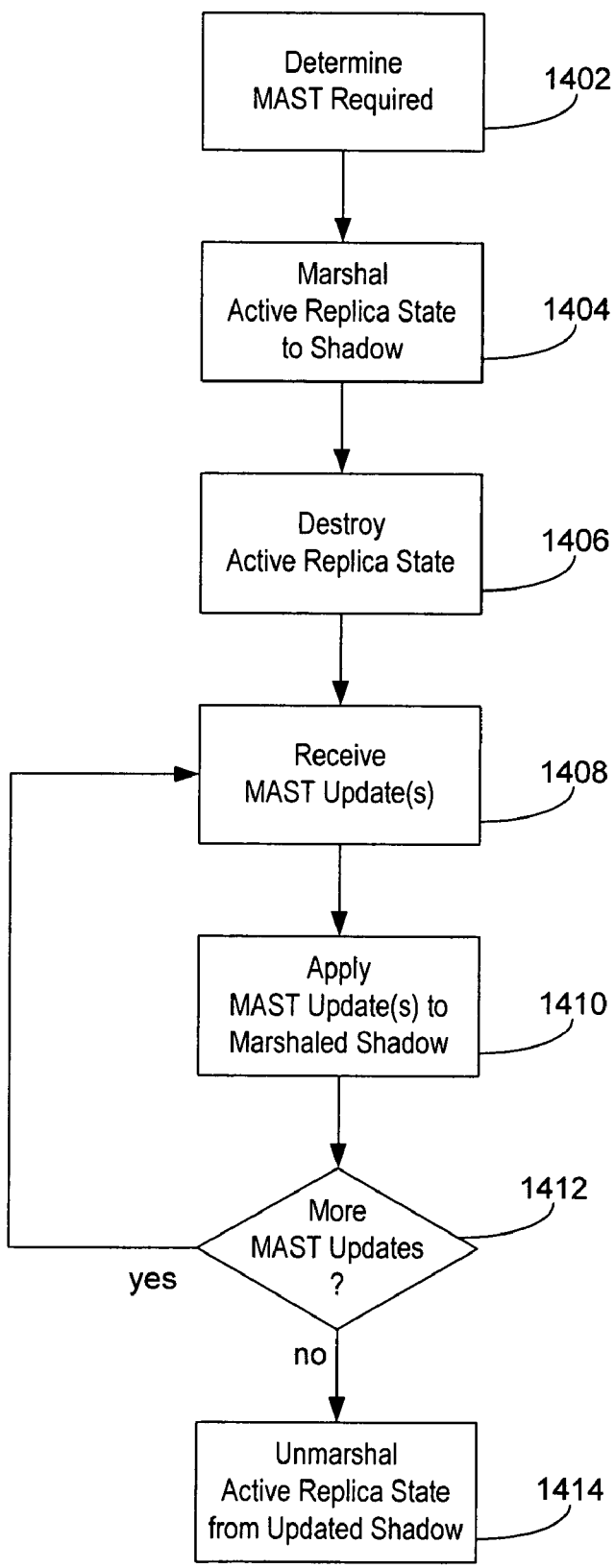
FIG. 14 is a flowchart depicting example steps for map assisted state transfer in accordance with an embodiment of the invention.

FIG. 14 depicts example steps for map assisted state transfer in accordance with an embodiment of the invention. At step 1402, a determination may be made that map assisted state transfer is required. For example, the active state replica 1304 (FIG. 13) may be determined to lag the active state replica 1302 to an unacceptable extent. Unacceptable lag may occur if, for example, in the course of normal operation, the active state replica 1304 requires a replica operation message 1218 containing an operation from a remote replica such as the replica 1202, but the remote replica is unable to provide the operation because the operation was deleted when an operations log (e.g., the operations log 408 of FIG. 4) containing the operation was truncated for normal housekeeping purposes.

At step 1404, the active replica state 1304 (FIG. 13) may be marshaled into the marshaled replica state shadow 1306 with any suitable marshaling procedure. Marshaling and unmarshaling procedures are known in the art and need not be described here in detail. Having been marshaled, at step 1406, the active replica state 1304 may be destroyed (e.g., deleted from system memory 106 of FIG. 1). Following step 1402 and prior to step 1408, the laggard replica 1204 may send a MAST trigger message 1220 (FIG. 12) to an expeditious replica such as the expeditious replica 1202 in order to trigger a sending of MAST update messages 1222 by the expeditious replica 1202. Alternatively, it may be the expeditious replica 1202 that determines that map assisted state transfer is required in step 1402, in which case the expeditious replica 1202 may send the MAST trigger message 1220 to the laggard replica 1204. The laggard replica 1204 may perform step 1402 by receiving the MAST trigger message 1220 from the expeditious replica 1202.

In any case, at step 1408, MAST updates (i.e., replica state updates) may be received, for example, contained in MAST update messages 1222 (FIG. 12). At step 1410, the MAST updates may be applied to the marshaled replica state shadow 1306 (FIG. 13). For example, each MAST update may contain one or more key-blob pairs and the updates may be applied to the marshaled shadow 1306 by searching the shadow map of the marshaled shadow 1306 for matching keys and replacing corresponding blobs in the marshaled shadow 1306 with the blobs (i.e., marshaled replacement objects) from the state updates. If the state update contains a key without a blob, the corresponding blob in the marshaled shadow 1306 may be deleted. If no matching key is found, the blob may be added to the marshaled shadow 1306 and a corresponding entry made in the shadow map. Instead of key-blob pairs, key-object (e.g., programmatic object) pairs may be utilized or, if the marshaled shadow 1306 is stored in a relational database, key-row pairs/tuples.

At step 1412, it may determined if there are more MAST updates to receive. If there are more MAST updates to receive, the procedure may return to step 1408. Otherwise, the procedure may progress to step 1414. At step 1414, a new active replica state 1304 may be instantiated by unmarshaling the updated marshaled shadow 1306 with an unmarshaling procedure corresponding to the marshaling procedure utilized in step 1404. For example, the marshaling of step 1404 and the unmarshaling of step 1414 may be performed by the marshal/unmarshal module 1214 of FIG. 12. Alternatively, the data-structures of the active replica state 1304 may be associated with one or more programmatic objects having marshal and unmarshal methods. In that case, the active replica state 1304 may be marshaled by invoking the marshal methods of its associated programmatic objects and similarly, unmarshaled by invoking the unmarshal methods.

Additional examples and context relevant to the present invention may be found in Appendix A.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for map assisted state transfer in a computer system having a first component and a second component, comprising:

maintaining a first active data-structure at said first component representing a state of the computer system;

maintaining a second active data-structure at the second component representing a replica of the state in the first active data-structure, wherein said first active data-structure comprises a plurality of programmatic objects arranged in an object-graph;

receiving at least one state update to said first active data-structure at said first component;
marshaling the second active data-structure into a marshaled shadow at the second component;
destroying said second active data-structure;
applying said at least one state update to the marshaled shadow; and
re-instantiating said second active data-structure by unmarshaling the marshaled shadow,
wherein the marshaled shadow comprises a shadow map,
wherein the marshaled shadow further comprises a plurality of shadowed objects corresponding to the plurality of programmatic objects,
wherein the shadow map facilitates placement of shadowed objects in the marshaled shadow independent of a need for class-specific object-graph navigation,
wherein each shadowed object of the shadowed objects comprises a marshaled object that is independent of one or more invariance relationships present in the second active data-structure,
wherein the state update comprises at least one key and a marshaled replacement object for said at least one key,
wherein the state update further comprises an incremental state update applied using one or more cryptographic hashes as the at least one key for locating data objects to be undated in the marshaled shadow, and
wherein the applying the state update to the marshaled shadow comprises, for said at least one key, finding a matching key in the shadow map, and replacing the shadowed object with the marshaled replacement object of the state update.

2. The method of the claim 1, wherein the marshaled shadow is updated by receiving one or more incremental state updates as said at least on state update, and applying the incremental state updates to the marshaled shadow, whereby only a portion of the marshaled shadow is updated.

3. The method of claim 1, wherein facilitating placement of shadowed objects in the marshaled shadow comprises maintaining a map of keys to shadowed objects.

4. The method of claim 1, wherein:
at least one of said at least one state update comprises at least one key independent of a marshaled replacement object; and
applying said at least one said state update comprises, for each of said at least one key that is independent of a marshaled replacement object:
finding a matching key in the shadow map; and
deleting the shadowed object.

5. The method of claim 1, wherein:
at least one of said at least one state update comprises at least one key without a matching key in the shadow map, and, for each of said at least one key without a matching key in the shadow map, a marshaled replacement object; and
applying each state update to the marshaled shadow comprises, for each of said at least one key:
failing to find a matching key in the shadow map; and
adding the marshaled replacement object of the state update to the marshaled shadow.

6. The method of claim 1, wherein the marshaled shadow comprises data stored in volatile storage.

7. The method of claim 1, wherein the marshaled shadow comprises data stored in non-volatile storage.

8. The method of claim 1, wherein the marshaled shadow comprises data stored in a plurality of relational database tables.

9. The method of claim 8, wherein:
said second active data-structure comprises a plurality of programmatic objects each associated with at least one of a plurality of object classes;
each object class has a corresponding relational database table; and
each programmatic object is marshaled into the relational database table corresponding to said at least one of the plurality of object classes associated with the programmatic object.

10. The method of claim 9, wherein applying said at least one state update to the marshaled shadow comprises updating the relational database table corresponding to said at least one of the plurality of object classes associated with the programmatic object.

11. The method of claim 1, wherein:
said second active data-structure comprises a plurality of programmatic objects having an invariance relationship; and
the marshaled shadow comprises a plurality of shadowed objects free of invariance relationships.

12. The method of claim 1, wherein:
each active data-structure comprises a plurality of programmatic objects associated with a plurality of methods comprising:
a marshal method; and
an unmarshal method;
marshaling each programmatic object into the marshaled shadow comprises invoking the marshal method of the programmatic object; and
re-instantiating each programmatic object comprises invoking the unmarshal method of the programmatic object.

13. The method of claim 1, further comprising determining that a map assisted state transfer is required.

14. The method of claim 13, wherein determining that a map assisted state transfer is required comprises receiving a map assisted state transfer trigger message.

15. The method of claim 13, wherein determining that a map assisted state transfer is required comprises restarting after a failure has occurred.

16. The method of claim 13, wherein determining that a map assisted state transfer is required comprises determining that said second active data-structure lags the first active data-structure by a predetermined amount of the state updates.

17. The method of claim 13, further comprising sending a map assisted state transfer trigger message.

18. A computerized system capable of map assisted state transfer, comprising:
a microprocessor;
a memory;
maintain, by a first component, a state of the system in a first active data-structure, the first component configured to send at least one state update message comprising at least one incremental change to the state, wherein said first active data-structure comprises a plurality of programmatic objects arranged in an object-graph;
maintain, by a second component, a replica of the state in a second active data-structure, the second component performs steps:
receive said at least one state update message including the at least one incremental change to the state;
marshal said second active data-structure into a marshaled shadow;
destroy said second active data-structure;

apply said at least one incremental change to the marshaled shadow; and re-instantiate said second active data-structure by unmarshaling the marshaled shadow, wherein the marshaled shadow comprises a shadow map, wherein the marshaled shadow further comprises a plurality of shadowed objects corresponding to the plurality of programmatic objects, wherein the shadow mare facilitates placement of shadowed objects in the marshaled shadow independent of a need for class-specific object-graph navigation, wherein each shadowed object of the shadowed objects comprises a marshaled object that is independent of one or more invariance relationships present in the second active data-structure, wherein the state update comprises at least one key and a marshaled replacement object for said at least one key, wherein the state update further comprises an incremental state update applied using one or more cryptographic hashes as the at least one key for locating data objects to be updated in the marshaled shadow, and wherein the applying said at least one incremental change to the marshaled shadow comprises, for said at least one key, finding a matching key in the shadow map, and replacing the shadowed object with the marshaled replacement object of the state update.

19. The system of claim 18, wherein the first component and the second component participate in a replicated state machine.

20. The system of claim 18, wherein the first component and the second component participate in a Windows File System (WinFS).

21. The system of claim 18, wherein:
said second active data-structure comprises a plurality of programmatic objects having an invariance relationship; and
the marshaled shadow comprises a plurality of shadowed objects free of invariance relationships.

22. The system of claim 18, wherein:
each active data-structure comprises a plurality of programmatic objects associated with a plurality of methods comprising:
a marshal method; and
an unmarshal method;
marshaling each programmatic object into the marshaled shadow comprises invoking the marshal method of the programmatic object; and
re-instantiating each programmatic object comprises invoking the unmarshal method of the programmatic object.

23. The system of claim 18, wherein the second component is further configured to determine that a map assisted state transfer from said first component to said marshaled shadow is required when replication of the at least one state update from the first component to the second component lags behind the at least on state update made to said first component by a predetermined amount.

24. The system of claim 18, wherein there are a plurality of the incremental changes applied to the marshaled shadow, whereby only a portion of the marshaled shadow is updated by each of the incremental changes.

25. A computer-readable storage medium, which is accessed by one or more computers, having instructions that executed by the one or more computers carry out a method comprising:
maintaining a first active data-structure at a first component representing a state of a computer system;
maintaining a second active data-structure at a second component representing a replica of the state in the first active data-structure, wherein said first active data-structure comprises a plurality of programmatic objects arranged in an object-graph;
receiving at least one state update to said first active data-structure at said first component;
marshaling the second active data-structure into a marshaled shadow at the second component;
destroying said second active data-structure;
applying said at least one state update to the marshaled shadow; and
re-instantiating said second active data-structure by unmarshaling the marshaled shadow,
wherein the marshaled shadow comprises a shadow map,
wherein the marshaled shadow further comprises a plurality of shadowed objects corresponding to the plurality of programmatic objects,
wherein the shadow mare facilitates placement of shadowed objects in the marshaled shadow independent of a need for class-specific object-graph navigation,
wherein each shadowed object of the shadowed objects comprises a marshaled object that is independent of one or more invariance relationships present in the second active data-structure,
wherein the state update comprises at least one key and a marshaled replacement object for said at least one key,
wherein the state update further comprises an incremental state update applied using one or more cryptographic hashes as the at least one key for locating data objects to be updated in the marshaled shadow, and
wherein the applying the state update to the marshaled shadow comprises, for said at least one key, finding a matching key in the shadow map, and replacing the shadowed object with the marshaled replacement object of the state update.

26. The computer readable storage medium of claim 25, wherein:
each active data-structure comprises a plurality of programmatic objects associated with a plurality of methods comprising:
a marshal method; and
an unmarshal method;
marshaling each programmatic object into the marshaled shadow comprises invoking the marshal method of the programmatic object; and
re-instantiating each programmatic object comprises invoking the unmarshal method of the programmatic object.

27. The computer readable storage medium of claim 25, wherein the marshaled shadow comprises data stored in volatile storage.

28. The computer readable storage medium of claim 25, wherein the marshaled shadow comprises data stored in non-volatile storage.

29. The computer readable storage medium of claim 25, wherein the marshaled shadow comprises data stored in a plurality of relational database tables.

30. The computer readable storage medium of claim 29, wherein:
the first active data-structure comprises a plurality of the programmatic objects each associated with at least one of a plurality of object classes;
each object class has a corresponding relational database table; and each programmatic object is marshaled into the relational database table corresponding to said at least one of the plurality of object classes associated with the programmatic object.

31. A computer-implemented method for map assisted state transfer in a computer system including a first component and a second component, the method comprising:

maintaining a first active replica state data-structure at said first component, said first active replica state data-structure representing a state of the computer system, wherein said first active replica state data-structure comprises a plurality of programmatic objects arranged in an object-graph;

maintaining a second active replica state data-structure at said second component that is a replica of the first active replica state data-structure for receiving replication of state updates made to said first active replica state data-structure;

receiving at said first component a plurality of state updates to be applied to said first active replica state data-structure;

marshaling the second active replica state data-structure into a marshaled shadow at said second component, said marshaled shadow being independent of an invariance relationship included in the second active replica state data-structure;

destroying the second active replica state data-structure;

applying at least one incremental state update of said plurality of state updates to the marshaled shadow, whereby only a portion of the marshaled shadow is updated; and re-instantiating the marshaled shadow as the second active replica state data-structure at said second component for receiving the replication of the state updates made to said first active replica state data-structure, wherein the marshaled shadow comprises a shadow map, wherein the marshaled shadow further comprises a plurality of shadowed objects corresponding to the plurality of programmatic objects, wherein the shadow map facilitates placement of shadowed objects in the marshaled shadow independent of a need for class-specific object-graph navigation, wherein each shadowed object of the shadowed objects comprises a marshaled object that is independent of one or more invariance relationships present in the second active replica state data-structure, wherein the state update comprises at least one key and a marshaled replacement object for said at least one key, wherein the state update further comprises at least one incremental state update applied using one or more cryptographic hashes as the at least one key for locating data objects to be undated in the marshaled shadow, and wherein the applying said at least one incremental state update to the marshaled shadow comprises, for said at least one key, finding a matching key in the shadow map, and replacing the shadowed object with the marshaled replacement object of the state update.

\* \* \* \* \*